United States Patent
Liu et al.

(10) Patent No.: US 12,473,535 B2
(45) Date of Patent: Nov. 18, 2025

(54) METHOD FOR PREPARING RETICULOCYTE SIMULATING PARTICLES AND PLATELET SIMULATING PARTICLES, AND REFERENCE CONTROL

(71) Applicant: SHENZHEN MINDRAY BIO-MEDICAL ELECTRONICS CO., LTD., Shenzhen (CN)

(72) Inventors: Bo Liu, Shenzhen (CN); Jian Xie, Shenzhen (CN); Gengwen Chen, Shenzhen (CN); Ruixia Song, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 1529 days.

(21) Appl. No.: 16/476,104

(22) PCT Filed: Jan. 19, 2017

(86) PCT No.: PCT/CN2017/071755
§ 371 (c)(1),
(2) Date: Jul. 4, 2019

(87) PCT Pub. No.: WO2018/126499
PCT Pub. Date: Jul. 12, 2018

(65) Prior Publication Data
US 2019/0352609 A1  Nov. 21, 2019

(30) Foreign Application Priority Data
Jan. 5, 2017 (WO) ............... PCT/CN2017/070307

(51) Int. Cl.
*C12N 5/078* (2010.01)
*G01N 1/30* (2006.01)
*G01N 1/34* (2006.01)
*G01N 1/28* (2006.01)

(52) U.S. Cl.
CPC ......... *C12N 5/0641* (2013.01); *C12N 5/0644* (2013.01); *G01N 1/30* (2013.01); *G01N 1/34* (2013.01); *C12N 2503/00* (2013.01); *G01N 2001/2893* (2013.01); *G01N 2001/302* (2013.01)

(58) Field of Classification Search
CPC ...... G01N 15/1012; G01N 1/28; G01N 33/96; G01N 33/49; G01N 1/34; G01N 1/30; G01N 35/00623; G01N 2001/2893; G01N 2001/4088; G01N 2015/1006; G01N 2001/302; G01N 2015/1018; G01N 33/48; C12N 5/0641; C12N 5/0644; C12N 2503/00
See application file for complete search history.

(56) References Cited

U.S. PATENT DOCUMENTS

| | | |
|---|---|---|
| 4,179,398 A | 12/1979 | Hunt |
| 4,264,470 A | 4/1981 | Chastain, Jr. et al. |
| 4,436,821 A | 3/1984 | Ryan |
| 5,008,201 A | 4/1991 | Ryan |
| 8,211,656 B2 | 7/2012 | Hyde |
| 8,669,106 B2 | 3/2014 | Sakthivel |
| 2005/0136409 A1 | 6/2005 | Jacobs et al. |
| 2005/0227359 A1 | 10/2005 | Ortiz et al. |

(Continued)

FOREIGN PATENT DOCUMENTS

| | | |
|---|---|---|
| CN | 1723032 A | 1/2006 |
| CN | 1880942 A | 12/2006 |
| CN | 1891230 A | 1/2007 |

(Continued)

OTHER PUBLICATIONS

Reed et al. Flow cytometric detection of human red cells labeled with a fluorescent membrane label: potential application to in vivo survival studies. Transfusion, 1991, vol. 31, No. 6, pp. 502-508. (Year: 1991).*
Krutzik et al. Fluorescent Cell Barcoding for Multiplex Flow Cytometry. Curr Protoc Cytom. 2011, pp. 1-22. (Year: 2011).*
McLaren et al. Statistical and graphical evaluation of erythrocyte volume distributions. American Physiological Scoiety. Heart & Circulatory Physiology, 1987, vol. 252, Issue 4, pp. H857-H866. (Year: 1987).*
GE Healthcare. Product Booklet. Amersham Eu (TMT) Isothiocyanate, 2006, pp. 1-15. (Year: 2006).*
Vassar et al. Physicochemical Effects of Aldehydes on the Human Erythrocyte. The Journal of Cell Biology, 1972, vol. 58, pp. 809-818. (Year: 1972).*

(Continued)

*Primary Examiner* — Shafiqul Haq
(74) *Attorney, Agent, or Firm* — Syncoda LLC; Feng Ma

(57) ABSTRACT

Provided are a method for preparing reticulocyte simulating particles and platelet simulating particles, and a reference control. The method for preparing the reticulocyte simulating particles comprises: staining mammalian anucleated red blood cells having a volume of 60-120 fL with a protein fluorescent dye activated by N-hydroxysuccinimide, and fixing the anucleated red blood cells to prepare the reticulocyte simulating particles. The platelet simulating particles are prepared from mammalian anucleated red blood cells having a volume of 2-25 fL, and the steps of preparing the platelet simulating particles are the same as that for the reticulocyte simulating particles. The preparation method comprises: using an protein fluorescent dye activated by N-hydroxysuccinimide to stain mammalian anucleated red blood cells having different volumes, so as to respectively obtain reticulocyte simulating particles and platelet simulating particles. The fluorescence and volume direction thereof in the scatter diagram are similar to the scatter diagram distribution of reticulocytes, reticulated platelets and platelets in fresh blood. The prepared simulating particles have good stability and do not interfere with the counting and differentiation of other cell particles.

12 Claims, 8 Drawing Sheets

(56) References Cited

U.S. PATENT DOCUMENTS

2006/0223187 A1    10/2006    Carver et al.
2012/0308985 A1    12/2012    Ryan et al.

FOREIGN PATENT DOCUMENTS

| | | |
|---|---|---|
| CN | 101231243 A | 7/2008 |
| CN | 101236158 A | 8/2008 |
| CN | 101501497 A | 8/2009 |
| CN | 101561443 A | 10/2009 |
| CN | 101723874 A | 6/2010 |
| CN | 101750476 A | 6/2010 |
| CN | 101811778 A | 8/2010 |
| CN | 101881778 A | 11/2010 |
| CN | 101918431 A | 12/2010 |
| CN | 102115456 A | 7/2011 |
| CN | 102177437 A | 9/2011 |
| CN | 102232085 A | 11/2011 |
| CN | 102264914 A | 11/2011 |
| CN | 102459637 A | 5/2012 |
| CN | 103454410 A | 12/2013 |
| CN | 104749144 A | 7/2015 |
| CN | 105717312 A | 6/2016 |
| WO | 0058362 A1 | 10/2000 |
| WO | 0061747 A9 | 7/2002 |
| WO | 2011000516 A2 | 1/2011 |

OTHER PUBLICATIONS

First Office Action issued in related Chinese Application No. 201780081863.8, dated Dec. 18, 2019, 8 pages.

Kitty de Jong, et al., "Short survival of phosphatidylserine-exposing red blood cells in murine sickle cell anemia", «Red Cells», From www.bloodjournal.org by guest on Sep. 11, 2016. For personal use only, pp. 1577-1584.

Yunnan Provincial Health Bureau, "Practical Hematology", Feb. 1976, pp. 1-18.

\* cited by examiner

Scatter diagrams of low-value combined reference control

Scatter diagrams of mid-value combined reference control

Scatter diagrams of high-value combined reference control

Scatter diagrams of low-value combined reference control after storing for three months at 2-8°C Scatter diagrams of mid-value combined reference control after storing for three months at 2-8°C Scatter diagrams of high-value combined reference control after storing for three months at 2-8°C

METHOD FOR PREPARING RETICULOCYTE SIMULATING PARTICLES AND PLATELET SIMULATING PARTICLES, AND REFERENCE CONTROL

CROSS-REFERENCE TO RELATED APPLICATIONS

This application is a national stage application of Patent Cooperation Treaty Application No. PCT/CN2017/07175, filed on Jan. 19, 2017, which claims priority and benefit of Patent Cooperation Treaty Application No. PCT/CN2017/070307, filed on Jan. 5, 2017, the content of each of the above-mentioned applications is hereby incorporated by reference in their entireties.

TECHNICAL FIELD

The present application relates to the field of hematology reference control, and in particular, to a method for preparing reticulocyte simulating particles, a method for preparing platelet simulating particles, and a reference control containing the prepared reticulocyte simulating particles and platelet simulating particles.

BACKGROUND

Reticulocytes are immature erythrocytes (red blood cells) and are an important index for reflecting the hematopoietic function of a bone marrow erythroid system and for determining anemia and the curative effects of related diseases. Reticulocytes are greatly significant for the diagnosis and treatment effect observation of hematological diseases. Reticulocyte-related parameters are important information provided by Medium-grade and high-grade blood cell analyzers. A hematology reference control, as a liquid containing one or more blood components or their analogs, has the same detectable characteristics as blood and is used for daily monitoring the accuracy and precision of blood analyzers. Reticulocyte simulating particles and platelet simulating particles are blood cell analogs that respectively simulate reticulocytes and platelets in the hematology reference control.

There are many methods for preparing reticulocyte simulating particles. The first method is to swell the cell membrane of a red blood cell by changing the osmolarity, so as to induce a porous blood cell membrane to permit entry of nucleic acids into the red blood cell for simulating the morphology of reticulocyte. This preparation method has high process requirements, is difficult to operate, and has low mass production efficiency. Moreover, the cells undergo swelling and shrinking, which causes cell membrane strength to decrease. The second method is to enrich and purify reticulocytes in the blood of anemic animals, such as pigs, and stabilize the reticulocytes by using a fixative. In this preparation method, reticulocytes are difficult to purify. Furthermore, the costs of animal blood (raw material) are high, and particle volume parameters thereof cannot effectively simulate the distribution of human reticulocytes. The third method is to oxidize exogenous nucleic acid, in order to cross-link aldehyde groups with the surface of human red blood cell membranes to simulate particle fluorescence signal. This method involves excessive process steps and complex, uncontrollable reaction conditions, thus decreasing process practicability and controllability.

Also, lots of methods for preparing platelet simulating particles are developed. The first method is to use human platelets as raw materials and use polyethylene glycol (PEG) to enhance the stability of the platelets. In this preparation method, the platelets are easily activated and thus cause an aggregation effect, which leads to the failure of reference control. Moreover, commercial sources of human platelets are expensive. The second method is to use low-cost goat red blood cells as raw materials to prepare platelet simulating particles. This method can reduce the aggregation effect of human platelets. However, this method cannot effectively simulate the volume distribution of human platelets, since it requires shrinking of goat red blood cells to adjust volume in order to prepare the platelet simulating particles. Moreover, the shrunken goat red blood cells have a tendency towards recovering from deformation in isosmotic preservation solutions. The third method is to mix goat blood having different red blood volume characteristics to simulate the volume distribution of human platelets. However, the process of this method is overly complex. At the same time, fixed platelet particles have an anti-hemolytic effect on hemolytic agents. When a reference control containing platelets and white blood cells are used for detection, the platelet simulating particles prepared by this third method will cause false increasing in white blood cell counts and influence the accuracy of reference control. The fourth method is to weakly fix animal red blood cells to meet the demand of hemolytic activity on hemolytic agents, then to adjust the volume under different osmotic pressure, and finally mix the red blood cells that have varying volumes to achieve a similar volume distribution of human platelets. However, process practicability and controllability are still major challenges.

Therefore, there is an urgent need to develop a method for preparing reticulocyte simulating particles and platelet simulating particles, which is simple, economical, and suitable for industrialized production, to meet the production and use demands of hematology reference control.

SUMMARY

The purposes of the present application are to provide a new method for preparing reticulocyte simulating particles, a new method for preparing platelet simulating particles, and to provide a reference control containing the prepared reticulocyte simulating particles and platelet simulating particles.

In order to achieve the above purposes, the present application provides the following technical solutions:

One aspect of the present application discloses a method for preparing reticulocyte simulating particles, comprising: staining mammalian anucleated red blood cells with a protein fluorescent dye having a carboxyl group activated by N-hydroxysuccinimide, and fixing the mammalian anucleated red blood cells to prepare the reticulocyte simulating particles, wherein the fixing can be performed before or after the staining, a volume of each of the the mammalian anucleated red blood cells is 60-120 fL, and the mammalian anucleated red blood cells are preferably human red blood cells, rabbit red blood cells, bovine red blood cells, pig red blood cells, horse red blood cells or guinea pig red blood cells.

It should be noted that, the key point of the present application is to stain mammalian anucleated red blood cells, each of which has a volume of 60-120 fL, with a protein fluorescent dye activated by N-hydroxysuccinimide, wherein the volume of each of the mammalian anucleated red blood cells is limited to 60-120 fL, such that the prepared simulating particles can effectively simulate the fluorescence and volume properties of reticulocytes. Furthermore, in the present application, the simulating particles stained with the protein fluorescent dye activated by N-hydroxysuccinimide, have similar membrane properties to reticulocytes and can meet reference control requirements of hemolytic and non-hemolytic detection channels. The protein fluorescent dye activated by N-hydroxysuccinimide is obtained by using N-hydroxysuccinimide to activate carboxyl group of the protein fluorescent dye, such that the protein fluorescent dye can be stably bound to the membrane surface of each mammalian anucleated red blood cell and ensure the binding stability of the protein fluorescent dye to the simulating particles. It should also be noted that, in general, mammalian red blood cells having a volume of 60-120 fL mainly comprise human red blood cells, rabbit red blood cells, bovine red blood cells, pig red blood cells, horse red blood cells and guinea pig red blood cells, all of which can be used to prepare the reticulocyte simulating particles in the present application. It should be understood that, the reticulocyte simulating particles mentioned in the present application can be prepared from any anucleated red blood cells, as long as the volume thereof is 60-120 fL. Such anucleated red blood cells are not limited to human red blood cells, rabbit red blood cells, bovine red blood cells, pig red blood cells, horse red blood cells and guinea pig red blood cells. It should also be noted that in the present application, the fixing is a weak fixing, namely, during the time the cells are fixed, cell activity can be maintained to some extent, such that the cells can remain stable in a long term and can be lysed with a hemolytic agent.

It can be understood that, reticulocyte simulating particles can be obtained simply and effectively by using the preparation method of the present application. On the basis of the reticulocyte simulating particles prepared in the present application, a spheroidization can also be performed on the prepared reticulocyte simulating particles, so as to meet different demands. Furthermore, the step of spheroidization can be integrated into the preparation method of the present application, which is not specifically defined herein.

Preferably, in the preparation method of the present application, the staining of mammalian anucleated red blood cells with a protein fluorescent dye having a carboxyl group activated by N-hydroxysuccinimide comprises the following steps:

extracting the mammalian anucleated red blood cells;

providing the protein fluorescent dye activated by N-hydroxysuccinimide, wherein the protein fluorescent dye has an activatable carboxyl group, and the carboxyl group is activated by N-hydroxysuccinimide;

incubating the mammalian anucleated red blood cells with the protein fluorescent dye activated by N-hydroxysuccinimide for staining the mammalian anucleated red blood cells, thus obtaining stained red blood cells.

Preferably, the preparation method of the present application further comprises washing the stained and fixed cells.

It can be understood that, the purpose of the washing is to discard the excessive or unstably bound protein fluorescent dye and fixative, to avoid influencing subsequent steps or other components of a combined reference control. A conventional buffer solution is applied in the washing process, such as a mixed solution containing citric acid and sodium citrate, or a mixed solution of citric acid, sodium citrate and sodium chloride, which is not specifically defined herein.

Preferably, the protein fluorescent dye having a carboxyl group activated by N-hydroxysuccinimide has a structure represented by general formula I,

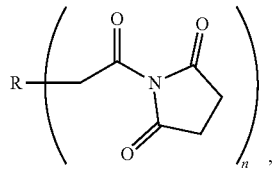

general formula I in general formula I, R is a protein fluorescent dye, n is an integer of 1-4, and n depends on the number of carboxyl groups in the protein fluorescent dye.

Preferably, the protein fluorescent dye has at least one of structures represented by general formula II, general formula III, general formula IV and general formula V,

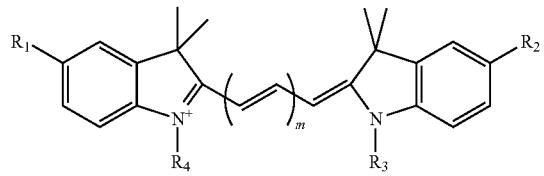

general formula II

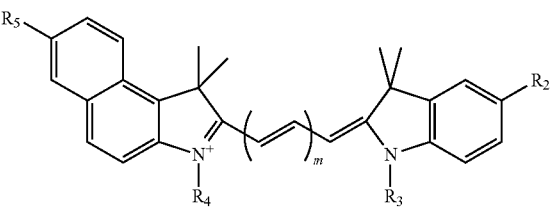

general formula III

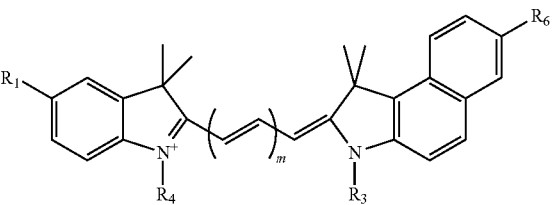

general formula IV

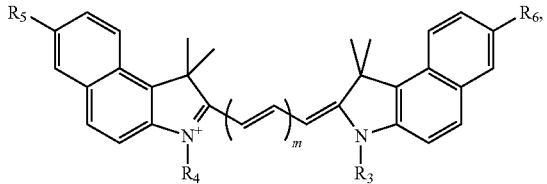

general formula V in general formula II to general formula V, m is 0, 1, 2 or 3, and $R_1$, $R_2$ are each independently selected from sulfonic acid group, halogen atom or hydrogen atom;

$R_3$ and $R_4$ are each independently selected from alkyl or carboxyl-containing alkyl, and at least one of $R_3$ and $R_4$ is carboxyl-containing alkyl;

$R_5$ and $R_6$ are each independently selected from sulfonic acid group, halogen atom, alkyl or hydrogen atom.

It should be noted that, in general formula II to general formula V, group $R_1$, $R_2$, $R_3$, $R_4$, $R_5$ and $R_6$ are respectively selected without influencing each other.

Preferably, the protein fluorescent dye comprises at least one of fluorescent dyes A-H, structural formula of the fluorescent dye A is

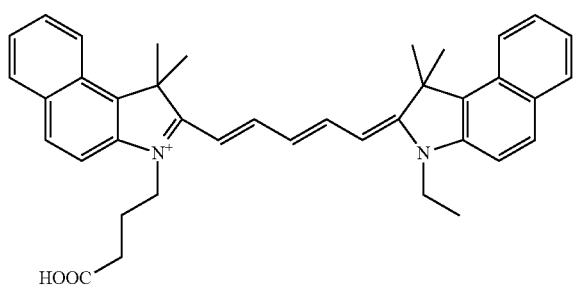 [SMILES: CCN1/C(=C/C=C/C=C/C2=[N+](CCCC(=O)O)c3ccc4ccccc4c3C2(C)C)C(C)(C)c2c1ccc1ccccc21]

structural formula of the fluorescent dye B is

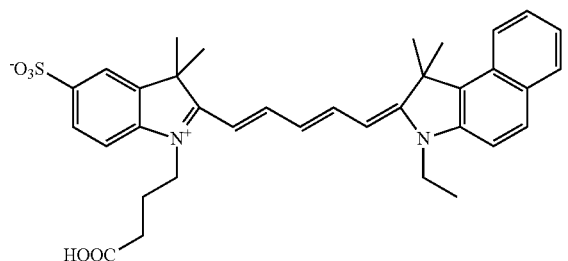

structural formula of the fluorescent dye C is

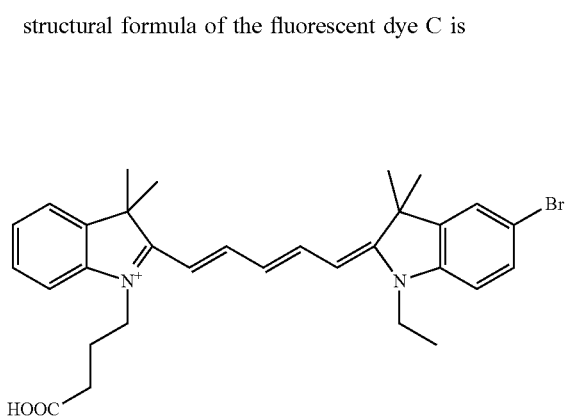

structural formula of the fluorescent dye D is

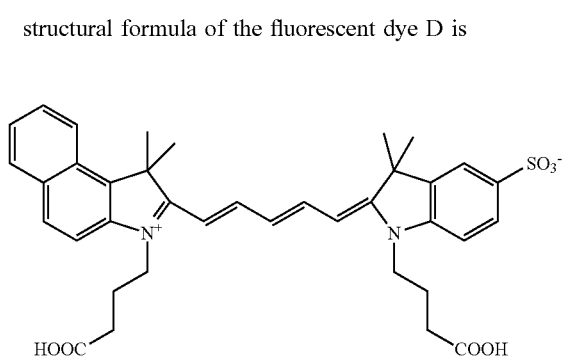

structural formula of the fluorescent dye E is

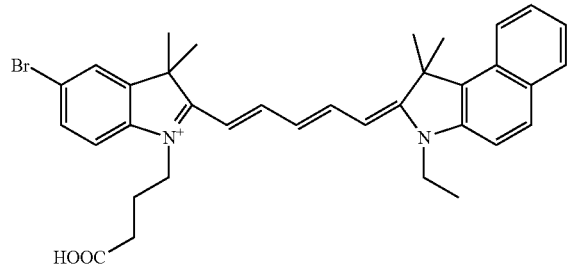 [SMILES: CCN1/C(=C/C=C/C=C/C2=[N+](CCCC(=O)O)c3ccc(Br)cc3C2(C)C)C(C)(C)c2c1ccc1ccccc21]

structural formula of the fluorescent dye F is

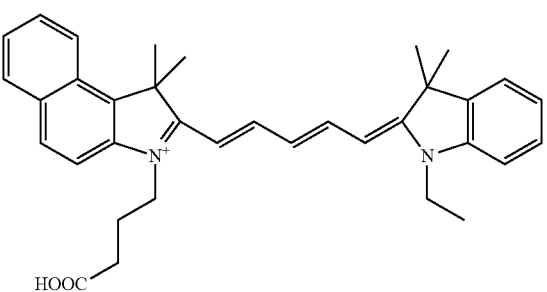 [SMILES: CCN1/C(=C/C=C/C=C/C2=[N+](CCCC(=O)O)c3ccc4ccccc4c3C2(C)C)C(C)(C)c2ccccc21]

structural formula of the fluorescent dye G is

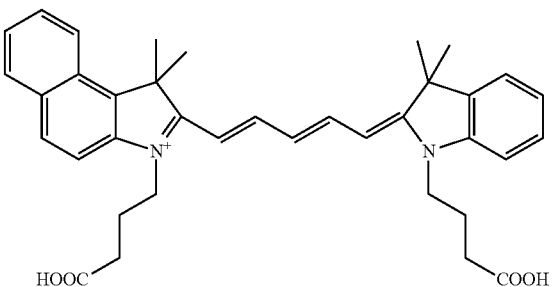 [SMILES: CC1(C)C(/C=C/C=C/C=C2/N(CCCC(=O)O)c3ccccc3C2(C)C)=[N+](CCCC(=O)O)c2ccc3ccccc3c21]

structural formula of the fluorescent dye H is

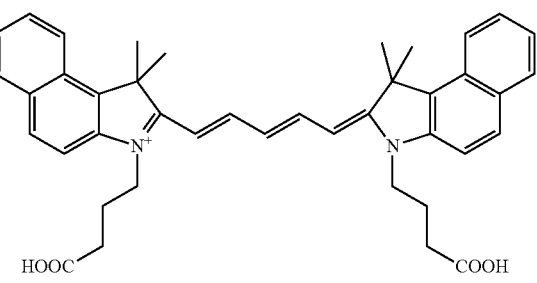

Preferably, a fixative used in the fixing comprises at least one of heavy metal salt, formaldehyde, pyruvaldehyde, glutaraldehyde and paraformaldehyde.

Preferably, a reaction concentration of formaldehyde, pyruvaldehyde, glutaraldehyde or paraformaldehyde is 0.005%-1% in volume ratio.

Preferably, the heavy metal salt is dichromate, and more preferably is potassium dichromate or dichromic acid.

Preferably, the preparation method of the present application further comprises sphering the mammalian anucleated red blood cells.

Another aspect of the present application discloses reticulocyte simulating particles prepared by the preparation method of the present application.

Another aspect of the present application discloses a method for preparing platelet simulating particles, comprising: staining mammalian anucleated red blood cells with a protein fluorescent dye having a carboxyl group activated by N-hydroxysuccinimide, and fixing the mammalian anucleated red blood cells to prepare the platelet simulating particles, wherein the fixing can be performed before or after the staining, a volume of each of the mammalian anucleated red blood cells is 2-25 fL, and the mammalian anucleated red blood cells are preferably goat red blood cells or sheep red blood cells.

It should be noted that, the key point of the present application is to stain mammalian anucleated red blood cells, each of which has a volume of 2-25 fL, with a protein fluorescent dye activated by N-hydroxysuccinimide, wherein the volume of the mammalian anucleated red blood cells is limited to 2-25 fL, such that the prepared simulating particles can effectively simulate the fluorescence and volume properties of platelets. Furthermore, in the present application, the simulating particles stained with the protein fluorescent dye activated by N-hydroxysuccinimide have similar membrane properties to platelets and can meet reference control requirements of hemolytic and non-hemolytic detection channels. In the present application, the method for preparing platelet simulating particles and the method for preparing reticulocyte simulating particles both use the same protein fluorescent dye activated by N-hydroxysuccinimide for staining. However, the key difference between the two methods is that mammalian anucleated red blood cells having different volumes are used. It is proved in the research of the present application that, by using the preparation methods of the present application, mammalian anucleated red blood cells having a volume of 60-120 fL can simulate reticulocytes, and mammalian anucleated red blood cells having a volume of 2-25 fL can simulate platelets. It should also be noted that, in general, mammalian red blood cells having a volume of 2-25 fL mainly comprise goat red blood cells or sheep red blood cells, both of which can be used to prepare the platelet simulating particles in the present application. It can be understood that, mammalian red blood cells having a volume of 2-25 fL can be used to prepare the platelet simulating particles in the present application and not limited to goat red blood cells or sheep red blood cells.

It can be understood that, platelet simulating particles can be obtained simply and effectively by using the preparation method of the present application. On the basis of the platelet simulating particles prepared in the present application, a spheroidization can also be performed on the prepared platelet simulating particles, so as to meet different demands. Furthermore, the step of spheroidization may be integrated into the preparation methods of the present application, which is not specifically defined herein.

Another aspect of the present application discloses platelet simulating particles prepared by the preparation method of the present application, and the platelet simulating particles comprise reticulated platelet simulating particles.

Another aspect of the present application discloses a reference control or calibrator for a blood analyzer, which contains the reticulocyte simulating particles prepared in the present application and/or the platelet simulating particles prepared in the present application.

Preferably, the reference control or calibrator further contains at least one of the following: white blood cell simulating particles, red blood cell simulating particles, and nucleated red blood cell simulating particles.

It should also be noted that, in the reference control or calibrator of the present application, concentration of each component such as the reticulocyte simulating particles, the platelet simulating particles, white blood cells or the white blood cell simulating particles, and red blood cells or the red blood cell simulating particles can be adjusted according to different requirements, so as to prepare low-value, mid-value or high-value reference control or calibrator, which is not specifically limited herein.

Another aspect of the present application discloses a cell simulating particle for a blood analyzer, and the cell simulating particle is a mammalian anucleated red blood cell with a surface thereof cross-linked with at least one protein fluorescent dye molecule.

It should be noted that, the key point of the present application is to simulate the fluorescence and volume properties of other blood cells by cross-linking a dye on the surface of mammalian anucleated red blood cells, so as to prepare blood cell simulating particles for reference control of the blood analyzer.

In one preferred embodiment of the present application, it is particularly pointed out that, the cell simulating particle, which is obtained by cross-linking a mammalian anucleated red blood cell having a volume of 60-120 fL with protein fluorescent dye molecule, are capable of simulating reticulocytes, because the fluorescence and volumetric direction in the scatter diagram of the cell simulating particles are in consistent with the distribution of reticulocytes. On this base, the present application provides a method for preparing reticulocyte simulating particles.

More preferably, the mammalian anucleated red blood cell having a volume of 60-120 fL is a human red blood cell, a rabbit red blood cell, a bovine red blood cell, a pig red blood cell, a horse red blood cell or a guinea pig red blood cell.

In another preferred embodiment of the present application, it is pointed out that, the cell simulating particle, which is obtained by cross-linking a mammalian anucleated red blood cell having a volume of 2-25 fL with protein fluorescent dye molecule, are capable of simulating platelets containing reticulated platelets, because the fluorescence and volumetric direction in the scatter diagram thereof are in consistent with the distribution of reticulated platelets and platelets. Therefore, the present application provides a method for preparing platelet simulating particles.

More preferably, the mammalian anucleated red blood cell having a volume of 2-25 fL is a goat red blood cell or a sheep red blood cell.

It should be noted that, in the above two preferred embodiments, different particle fluorescence intensities are formed due to the difference in cross-linking reactions, so that reticulocyte simulating particles and platelet simulating particles containing reticulated platelet simulating particles are respectively obtained. It can be understood that, the inventive concept of the present application is to simulate the fluorescence and volumetric properties of other blood cells by cross-linking a dye on surface of mammalian anucleated red blood cells. On this base, other blood cells used in a blood analyzer can be simulated, not just limited to the reticulocyte simulating particles and the platelet simulating particles containing reticulated platelet simulating particles.

The protein fluorescent dye molecule cross-linked with the mammalian anucleated red blood cells in the present application is preferably a protein fluorescent dye molecule which has an activatable carboxyl group, which is cross-linked with an activatable amino group on the surface of the mammalian anucleated red blood cells, i.e., the amino group and the carboxyl group are cross-linked via N-hydroxysuccinimide.

Similarly, in the present application, the protein fluorescent dye used for preparing cell simulating particles for the blood analyzer preferably has at least one of the structures represented by general formula II, general formula III, general formula IV and general formula V. More preferably, the mammalian anucleated red blood cells used in the present application are further sphered.

By applying the above embodiments, the present application has the following beneficial effects:

In the methods for preparing reticulocyte simulating particles and platelet simulating particles in the present application, mammalian anucleated red blood cells with different volumes are stained with protein fluorescent dye activated by N-hydroxysuccinimide, so as to respectively obtain reticulocyte simulating particles and platelet simulating particles. The fluorescence and volumetric direction in the scatter diagram of the simulating particles prepared in the present application are similar to the distribution of the scatter diagram of fresh blood reticulocytes, reticulated platelets, and platelets. The simulating particles have good stability and do not interfere with counting and differentiation of both white blood cell channel and nucleated red blood cell channel. The preparation methods of the present application are simple and easy to implement, and provide a new method and approach for preparing reticulocyte simulating particles and platelet simulating particles.

The reference control containing the reticulocyte simulating particles and the platelet simulating particles prepared in the present application can also be mixed with white blood cell simulating particles, nucleated red blood cell simulating particles and red blood cell simulating particles, so as to prepare a combined reference control. Thus, the purpose of monitoring and evaluating all detection parameters, as required for reference control of a blood analyzer, can be realized by using a single product. As shown in 3-month continuous stability test results of the reference control, the stability level of the reference control or calibrator of the present application has reached an international first-class product level.

In FIG. 2 to FIG. 18, 1 represents reticulocytes, 2 represents platelets, 3 represents reticulated platelets, 4 represents red blood cells, 5 represents lymphocytes, 6 represents monocytes, 7 represents neutrophil granulocytes, 8 represents eosinophil granulocytes, 9 represents basophil granulocytes, and 10 represents nucleated red blood cells.

DETAILED DESCRIPTION

Protein fluorescent dyes used in the present application refer to fluorescent dyes used to stain proteins in the biotechnology field.

As found in the study on staining anucleated red blood cells with a protein fluorescent dye in the present application, after activating carboxyl group contained in the protein fluorescent dye by using N-hydroxysuccinimide and then incubating the anucleated red blood cells with the protein fluorescent dye, cell membranes of the anucleated red blood cells will not be destroyed, and the dye will be stably bound to the cell membranes, such that the anucleated red blood cells, which originally do not emit fluorescence signal, will emit fluorescence signal under laser irradiation, allowing the anucleated red blood cells to be used as raw materials for preparing some blood reference controls which need to generate fluorescence signal during detection. Moreover, mammalian anucleated red blood cells having different volumes can be used to respectively prepare reticulocyte simulating particles and platelet simulating particles containing reticulated platelets. Herein, the protein fluorescent dye activated by N-hydroxysuccinimide, which is applicable to the present application, is represented by general formula I. Preferably, the protein fluorescent dye has at least one of the structures represented by general formula II, general formula III, general formula IV and general formula V. More preferably, the protein fluorescent dye comprises at least one of fluorescent dyes A-H disclosed in the present application.

Figure 1:
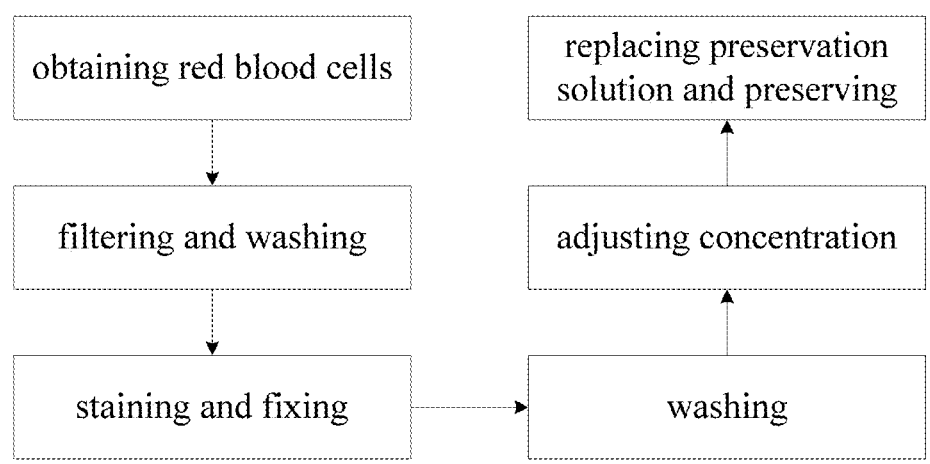
FIG. 1 illustrates a flowchart of preparing simulating particles according to an embodiment of the present application.

Compared with the method of using plastic particles or liposome cross-linked dyes to simulate cells, the present application uses anucleated red blood cells as raw materials to prepare simulating particles with membrane properties similar to that of reticulocytes and reticulated platelets, which can meet reference control requirements of hemolytic and non-hemolytic detection channels. The simulating particles prepared in the present application not only have good stability, but also do not influence counting and differentiation of other cell particles. In addition, in the preparation method of the present application as shown in FIG. 1, anucleated red blood cells are only subjected to staining, fixing, adjusting counts and preserving. The process is relatively simple and is convenient to implement.

The present application will be further described below in detail through specific embodiments and drawings. The following embodiments are only used for further illustration of the present application and should not be construed as limitations to the present application.

Unless otherwise specified, the instruments, equipments and solutions used in the embodiments are conventional selections. In the embodiments, the blood cell analyzer is a Mindray BC-6 series blood cell analyzer.

Embodiment 1

In this embodiment, the fluorescent dye A is activated by N-hydroxysuccinimide and dissolved in an organic solvent to prepare a mother solution of the fluorescent dye A. In this embodiment, specific steps of synthesizing the activated dye comprise: adding the dye A, N-hydroxysuccinimide (NHS) and 1-(3-dimethylaminopropyl)-3-ethylcarbodiimide hydrochloride (EDC) into dichloromethane and stirring them to react for 1 hour at normal temperature, thus obtaining the activated dye A. In other embodiments, other organic solvents, such as methanol, may also be used according to the type of dyes. Reaction conditions may be adjusted according to conventional technical means in the field.

The preservation solution used in this embodiment is a commercially available conventional preservation solution, and the preservation solution used in the following embodiment s is the same as that in this embodiment.

A method for preparing reticulocyte simulating particles comprises the following steps:

1. Human red blood cells were taken as raw materials and filtered, and the filtered red blood cells (abbreviated as RBCs) were collected.

2. The RBCs were centrifuged and washed twice with a washing solution I, wherein the washing solution I was a solution containing 2.0 g/L disodium hydrogen phosphate, 0.2 g/L sodium dihydrogen phosphate and 9.0 g/L sodium chloride.

3. The cell pellet was suspended in the washing solution I, and the mother solution of the fluorescent dye A was added until a final concentration of the fluorescent dye A reached 100 mg/L. The fluorescent dye was then added to the surface of the cell pellet and left standing for 3 minutes, so the fluorescent dye was in full contact with the cells and then mixed with the cells. After reaction, centrifugation was performed to discard the supernatant, a 4 times volume of a washing solution II was added, and centrifugation was performed to discard the supernatant, wherein the washing solution II was a solution containing 35 g/L sodium citrate and 0.2 g/L citric acid.

4. The cell pellet was suspended in the washing solution II, a fixative containing 37-40% formaldehyde was added until a final concentration thereof reached 0.1%. And the cells were treated at room temperature for 2 hours. After fixing, the washing solution II was added until an appropriate concentration of the RBCs was reached, and then centrifugation was performed to discard the supernatant, and washing was repeated twice.

5. The supernatant was discarded, and a preservation solution was added for suspending the RBCs until an appropriate concentration of the RBCs was reached, so as to obtain reticulocyte simulating particles. The simulating particles were refrigerated at 2-8° C., the supernatant preservation solution was replaced once every 24 hours, and after 3 times' replacement, the prepared reticulocyte simulating particles could be preserved for a long time in the preservation solution.

A method for preparing platelet simulating particles comprises the following steps:

1. Goat blood cells were taken as raw materials and filtered, and the filtered goat red blood cells (abbreviated as RBCs) were collected.

2. The goat RBCs were centrifuged and washed twice with a washing solution I, wherein the washing solution I was a solution containing 1.44 g/L disodium hydrogen phosphate, 0.27 g/L potassium dihydrogen phosphate, 8 g/L sodium chloride and 0.2 g/L potassium chloride.

3. The cell pellet was suspended in the washing solution I, the mother solution of the fluorescent dye A was added until a final concentration of the fluorescent dye A reached 50 mg/L, and mixing was quickly performed after adding the fluorescent dye A. The cells were labeled at room temperature for 1 hour, during which mixing was performed 3-4 times to make the fluorescent dye fully contact with the cells. After reaction, an equal volume of a washing solution II was added for dilution, centrifugation was performed to discard the supernatant, and washing with the washing solution II was repeated once, wherein the washing solution II was a solution containing 35 g/L sodium citrate and 0.2 g/L citric acid.

4. The cell pellet was suspended in the washing solution II, a fixative containing 37-40% formaldehyde was added until a final concentration thereof reached 0.05%, and the cells were treated at room temperature for 2 hours.

5. After fixing, an equal volume of the washing solution II containing bovine serum albumin (abbreviated as BSA) with a final concentration of 0.05% was added for dilution. Centrifugation was performed to discard the supernatant, and washing was repeated twice.

6. A preservation solution was added for suspending the PLTs until an appropriate concentration of the PLTs was reached, and the PLTs were refrigerated at 2-8° C., thus the preparation of platelet simulating particles containing reticulated platelets was completed.

Formulation of Combined Reference Controls:

White blood cell simulating particles, red blood cell simulating particles and nucleated red blood cell simulating particles were added into the reticulocyte simulating particles and platelet simulating particles containing reticulated platelets prepared in this embodiment, and they were mixed in proportion to form a reference control. The concentration of each component was as follows:

low-value: $2.8 \times 10^9$/L white blood cell simulating particles, $2.8 \times 10^{12}$/L red blood cell simulating particles, $75 \times 10^9$/L platelet simulating particles, $0.02 \times 10^{12}$/L reticulocyte simulating particles, and $0.11 \times 10^9$/L nucleated red blood cell simulating particles;

mid-value: $8.5 \times 10^9$/L white blood cell simulating particles, $4.5 \times 10^{12}$/L red blood cell simulating particles, $225 \times 10^9$/L platelet simulating particles, $0.11 \times 10^{12}$/L reticulocyte simulating particles, and $0.35 \times 10^9$/L nucleated red blood cell simulating particles; and high-value: $20 \times 10^9$/L white blood cell simulating particles, $5.2 \times 10^{12}$/L red blood cell simulating particles, $490 \times 10^9$/L platelet simulating particles, $0.26 \times 10^{12}$/L reticulocyte simulating particles, and $0.8 \times 10^9$/L nucleated red blood cell simulating particles.

Figure 2:
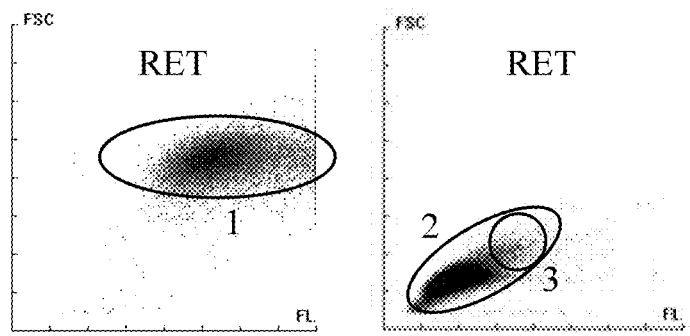
FIG. 2 illustrates scatter diagrams obtained by detecting reticulocyte simulating particles and platelet simulating particles containing reticulated platelets prepared by using the fluorescent dye A in the RET channel of a Mindray BC-6 series blood cell analyzer according to an embodiment of the present application, wherein the abscissa represents fluorescence intensity, and the ordinate represents forward scattered light intensity.
Figure 3:
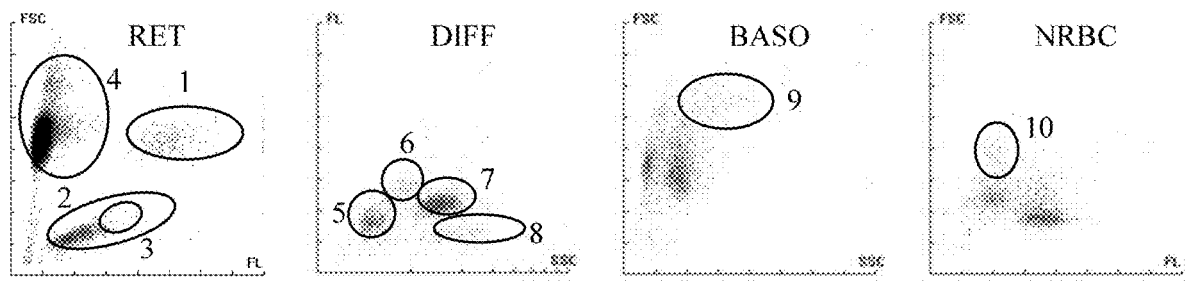
FIG. 3 illustrates scatter diagrams of low-value, mid-value and high-value combined reference controls containing reticulocyte simulating particles and platelet simulating particles containing reticulated platelets that are prepared by using the fluorescent dye A and additionally containing white blood cell simulating particles, nucleated red blood cell simulating particles, red blood cell simulating particles and a preservation solution according to an embodiment of the present application, wherein the abscissa of the RET channel represents fluorescence intensity, the ordinate of the RET channel represents forward scattered light intensity, the abscissa of the Diff channel represents side scattered light intensity, the ordinate of the Diff channel represents fluorescence intensity, the abscissa of the Baso channel represents side scattered light intensity, the ordinate of the Baso channel represents forward scattered light intensity, the abscissa of the NRBC channel represents fluorescence intensity, and the ordinate of the NRBC channel represents forward scattered light intensity.
Figure 3:
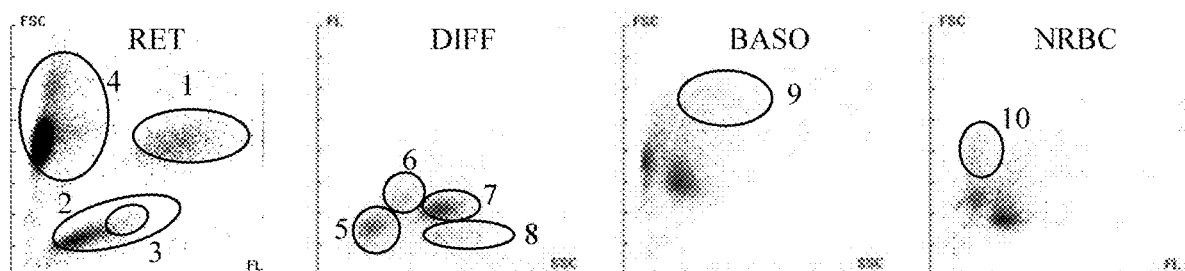
Figure 3:
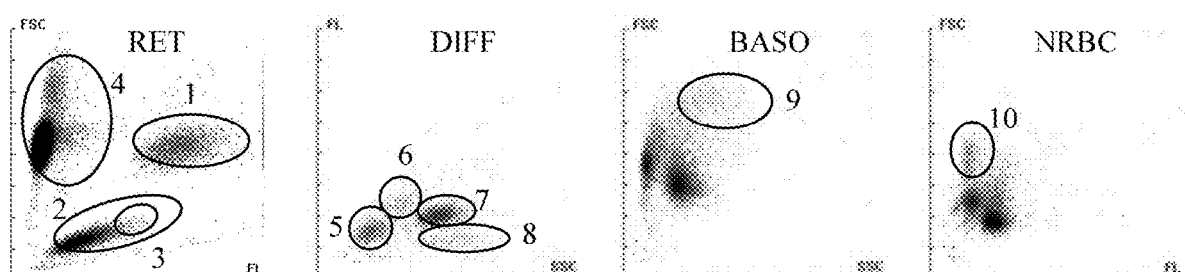

The reticulocyte simulating particles, the platelet simulating particles and the reference controls prepared in this embodiment were respectively detected by using a blood cell analyzer based on fluorescence staining as detection principle. Scatter diagrams of the reticulocyte simulating particles and the platelet simulating particles are shown in FIG. 2, wherein the left diagram is the scatter diagram of the reticulocyte simulating particles, and the right diagram is the scatter diagram of the platelet simulating particles. In FIG. 2, 1 represents reticulocytes, 2 represents platelets, and 3 represents reticulated platelets. Scatter diagrams of low-value, mid-value and high-value combined reference controls are shown in FIG. 3, wherein the diagrams in the first line are scatter diagrams of the low-value combined reference control, the diagrams in the second line are scatter diagrams of the mid-value combined reference control, and the diagrams in the third line are scatter diagrams of the high-value combined reference control. In FIG. 3, 1 represents reticulocytes, 2 represents platelets, 3 represents reticulated platelets, 4 represents red blood cells, 5 represents lymphocytes, 6 represents monocytes, 7 represents neutrophil granulocytes, 8 represents eosinophil granulocytes, 9 represents basophil granulocytes, and 10 represents nucleated red blood cells. The results of FIG. 2 show that, the reticulocyte simulating particles and the platelet simulating particles prepared in this embodiment have the same distribution of scatter diagrams for fresh blood reticulocytes and platelets. In the scatter diagrams of the platelet simulating particles, the upper right part of the platelets 2 is the reticulated platelets 3. The results of FIG. 3 show that, the reticulocyte simulating particles and the platelet simulating particles prepared in this embodiment do not interfere with counting and differentiation of other particle channels, such as white blood cell channel and nucleated red blood cell channel, and can be used to prepare blood reference controls or calibrators.

Embodiment 2

The fluorescent dye B was activated by N-hydroxysuccinimide and dissolved in an organic solvent to prepare a mother solution of the fluorescent dye B.

Preparation of Reticulocyte Simulating Particles:

1. Human red blood cells were taken as raw materials and filtered, and the filtered RBCs were collected.

2. The RBCs were centrifuged and washed twice with a washing solution I, wherein the washing solution I was a solution containing 1.41 g/L disodium hydrogen phosphate, 0.27 g/L potassium dihydrogen phosphate and 11.8 g/L potassium chloride.

3. The cell pellet was suspended in a potassium dichromate solution with a final concentration of 0.1 g/L, and a fixative containing 50% glutaraldehyde was added until a final concentration thereof reached 0.005%. And the fixing was performed at room temperature for 2 hours. After the fixing, the RBCs were centrifuged and washed twice with the washing solution I.

4. The cell pellet was suspended in a washing solution II and the mother solution of the fluorescent dye B was added until a final concentration of the fluorescent dye B reached 50 mg/L, and mixing was quickly performed after adding the fluorescent dye B. The cells were labeled at room temperature for 2 hours, during which mixing was performed 3-4 times to make the fluorescent dye fully contact with the cells. After reaction, a 4 times volume of the washing solution II of was added for dilution, centrifugation was performed to discard the supernatant, and washing with the washing solution II was repeated once, wherein the washing solution II was a solution containing 17 g/L sodium citrate, 0.1 g/L citric acid and 5 g/L sodium chloride.

5. The supernatant was discarded, and a preservation solution was added for suspending the RBCs until an appropriate concentration of the RBCs was reached, so as to obtain reticulocyte simulating particles. The simulating particles were refrigerated at 2-8° C., the supernatant preservation solution was replaced once every 24 hours, and after 3 times' replacement, the prepared reticulocyte simulating particles could be preserved for a long time in the preservation solution.

Preparation of Platelet Simulating Particles:

1. Goat blood cells were taken as raw materials and filtered, and the filtered goat RBCs were collected.

2. The RBCs were centrifuged and washed twice with a washing solution I, wherein the washing solution I was a solution containing 2.0 g/L disodium hydrogen phosphate, 0.2 g/L sodium dihydrogen phosphate and 9.0 g/L sodium chloride.

3. The cell pellet was suspended in the washing solution I, the mother solution of the fluorescent dye B was added until a final concentration of the fluorescent dye B reached 5 mg/L, and mixing was quickly performed after adding the fluorescent dye B. The cells were labeled at room temperature for 15 minutes, during which mixing was performed 3-4 times to make the fluorescent dye fully contact with the cells. After reaction, an equal volume of a washing solution II was added for dilution, centrifugation was performed to discard the supernatant, and washing was repeated twice, wherein the washing solution II was solution containing 17 g/L sodium citrate, 0.1 g/L citric acid and 5 g/L sodium chloride.

4. The cell pellet was suspended in the washing solution II, a fixative containing 50% glutaraldehyde was added until a final concentration thereof reached 0.005%, and a fixative containing 37-40% formaldehyde was added until a final concentration thereof reached 0.1%, and the cells were treated at room temperature overnight.

5. After fixing, an equal volume of the washing solution II containing BSA with a final concentration of 0.025% was added for dilution, centrifugation was performed to discard the supernatant, and washing was repeated twice.

6. A preservation solution was added for suspending the PLTs until an appropriate concentration of the PLTs was reached, and the PLTs were refrigerated at 2-8° C., thus the preparation of platelet simulating particles containing reticulated platelets was completed.

Formulation of Combined Reference Controls:

White blood cell simulating particles, red blood cell simulating particles and nucleated red blood cell simulating particles were added into the reticulocyte simulating particles and platelet simulating particles prepared in this embodiment, and they were mixed in proportion to form a combined reference control, such that the concentration of each component was as follows:

mid-value: $8.5 \times 10^9$/L white blood cell simulating particles, $4.5 \times 10^{12}$/L red blood cell simulating particles, $225 \times 10^9$/L platelet simulating particles, $0.11 \times 10^{12}$/L reticulocyte simulating particles, and $0.35 \times 10^9$/L nucleated red blood cell simulating particles.

Figure 5:
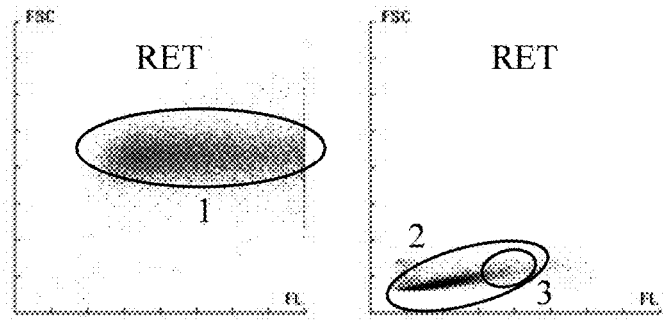
FIG. 5 illustrates scatter diagrams obtained by detecting reticulocyte simulating particles and platelet simulating particles containing reticulated platelets prepared by using the fluorescent dye B in the RET channel of a Mindray BC-6 series blood cell analyzer according to an embodiment of the present application, wherein the abscissa represents fluorescence intensity, and the ordinate represents forward scattered light intensity.
Figure 6:
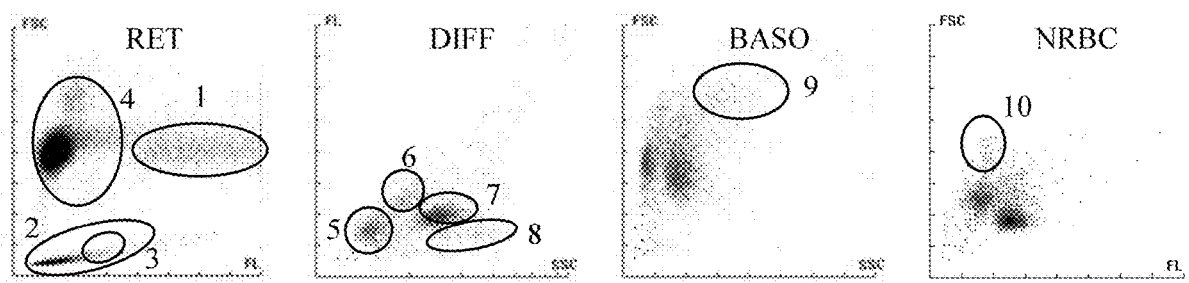
FIG. 6 illustrates scatter diagrams of mid-value combined reference control containing reticulocyte simulating particles and platelet simulating particles containing reticulated platelets prepared by using the fluorescent dye B and further containing white blood cell simulating particles, nucleated red blood cell simulating particles, red blood cell simulating particles and a preservation solution, wherein the abscissa of the RET channel represents fluorescence intensity, the ordinate of the RET channel represents forward scattered light intensity, the abscissa of the Diff channel represents side scattered light intensity, the ordinate of the Diff channel represents fluorescence intensity, the abscissa of the Baso channel represents side scattered light intensity, the ordinate of the Baso channel represents forward scattered light intensity, the abscissa of the NRBC channel represents fluorescence intensity, and the ordinate of the NRBC channel represents forward scattered light intensity.

The reticulocyte simulating particles, the platelet simulating particles and the reference controls prepared in this embodiment were respectively detected by using a blood cell analyzer based on fluorescence staining as detection principle. Scatter diagrams of the reticulocyte simulating particles and the platelet simulating particles are shown in FIG. 5, wherein the left diagram is the scatter diagram of the reticulocyte simulating particles, and the right diagram is the scatter diagram of the platelet simulating particles. In FIG. 5, 1 represents reticulocytes, 2 represents platelets, and 3 represents reticulated platelets. Scatter diagrams of the mid-value combined reference control are shown in FIG. 6. In FIG. 6, 1 represents reticulocytes, 2 represents platelets, 3 represents reticulated platelets, 4 represents red blood cells, 5 represents lymphocytes, 6 represents monocytes, 7 represents neutrophil granulocytes, 8 represents eosinophil granulocytes, 9 represents basophil granulocytes, and 10 represents nucleated red blood cells. The results of FIG. 5 show that, the reticulocyte simulating particles and the platelet simulating particles prepared in this embodiment have the same distribution of scatter diagrams for fresh blood reticulocytes and platelets. In the scatter diagrams of the platelet simulating particles, the upper right part of the platelets 2 is the reticulated platelets 3. The results of FIG. 6 show that, the reticulocyte simulating particles and the platelet simulating particles prepared in this embodiment do not interfere with the counting and differentiation of other particle channels, such as white blood cell channel and nucleated red blood cell channel, and can be used to prepare blood reference controls or calibrators.

Embodiment 3

The fluorescent dye C was activated by N-hydroxysuccinimide and dissolved in an organic solvent to prepare a mother solution of the fluorescent dye C.

Preparation of Reticulocyte Simulating Particles:

1. Human red blood cells were taken as raw materials and filtered, and the filtered RBCs were collected.

2. The RBCs were centrifuged and washed twice with a washing solution I, wherein the washing solution I was a solution containing 1.44 g/L disodium hydrogen phosphate, 0.27 g/L potassium dihydrogen phosphate, 8 g/L sodium chloride and 0.2 g/L potassium chloride.

3. The cell pellet was suspended in the washing solution I, and the mother solution of the fluorescent dye C was added until a final concentration of the fluorescent dye C reached 100 mg/L, and mixing was quickly performed after adding the fluorescent dye C. The cells were labeled at room temperature for 20 minutes, during which mixing was performed 3-4 times to make the fluorescent dye fully contact with the cells. After reaction, a 4 times volume of a washing solution II was added for dilution, centrifugation was performed to discard the supernatant, and washing was repeated once, wherein the washing solution II was a solution containing 17 g/L sodium citrate, 0.1 g/L citric acid and 5 g/L sodium chloride.

4. The cell pellet was suspended in the washing solution II, a fixative containing 50% glutaraldehyde was added until a final concentration thereof reached 0.05%, and the cells were treated at room temperature for 2 hours. After fixing, the washing solution II containing BSA with a final concentration of 1% was added for diluting the RBCs until an appropriate concentration of the RBCs was reached. Centrifugation was performed to discard supernatant, and washing was repeated twice.

5. A preservation solution was added for suspending the RBCs until an appropriate concentration of the RBCs was reached, so as to obtain reticulocyte simulating particles in this embodiment.

Preparation of Platelet Simulating Particles:

1. Goat blood cells were taken as raw materials and filtered, and the filtered goat RBCs were collected.

2. The goat RBCs were centrifuged and washed twice with a washing solution I, wherein the washing solution I was a solution containing 2.0 g/L disodium hydrogen phosphate, 0.2 g/L sodium dihydrogen phosphate and 9.0 g/L sodium chloride.

3. The cell pellet was suspended in the washing solution I, a certain volume of the mother solution of the fluorescent dye C was added until a final concentration of the fluorescent dye C reached 5 mg/L, and mixing was quickly performed after adding the fluorescent dye C. The cells were labeled at room temperature for 15 minutes, during which mixing was performed 3-4 times to make the fluorescent dye fully contact with the cells. After reaction, an equal volume of a washing solution II was added for dilution, centrifugation was performed to discard the supernatant, and washing was repeated once, wherein the washing solution II was solution containing 17 g/L sodium citrate, 0.1 g/L citric acid and 5 g/L sodium chloride.

4. The cell pellet was suspended in the washing solution II, a fixative containing 37-40% formaldehyde was added until a final concentration thereof reached 0.25%, and the cells were treated at room temperature treatment for 4 hours.

5. After fixing, an equal volume of the washing solution II containing BSA with a final concentration of 0.05% was added for dilution. Centrifugation was performed to discard the supernatant, and washing was repeated twice.

6. A preservation solution was added for suspending the PLTs until an appropriate concentration of the PLTs was reached, and the PLTs were refrigerated at 2-8° C., thus the preparation of platelet simulating particles containing reticulated platelets was completed.

Formulation of Combined Reference Controls:

White blood cell simulating particles, red blood cell simulating particles and nucleated red blood cell simulating particles were added into the reticulocyte simulating particles and platelet simulating particles prepared in this example, and they were mixed in proportion to form a combined reference control material, such that the concentration of each component was as follows:

mid-value: $8.5 \times 10^9$/L white blood cell simulating particles, $4.5 \times 10^{12}$/L red blood cell simulating particles, $225 \times 10^9$/L platelet simulating particles, $0.11 \times 10^{12}$/L reticulocyte simulating particles, and $0.35 \times 10^9$/L nucleated red blood cell simulating particles.

Figure 7:
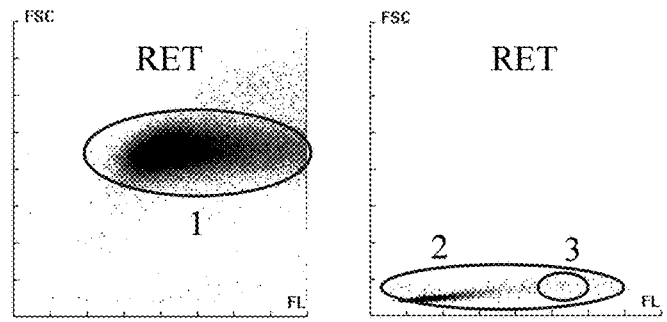
FIG. 7 illustrates scatter diagrams obtained by detecting reticulocyte simulating particles and platelet simulating particles containing reticulated platelets prepared by using the fluorescent dye C according to an embodiment of the present application in an RET channel of a Mindray BC-6 series blood cell analyzer, wherein the abscissa represents fluorescence intensity, and the ordinate represents forward scattered light intensity.
Figure 8:
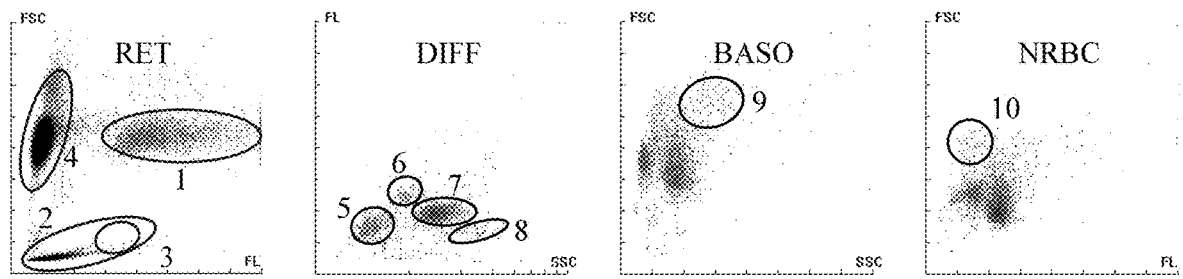
FIG. 8 illustrates scatter diagrams of mid-value combined reference control containing reticulocyte simulating particles and platelet simulating particles containing reticulated platelets prepared by using the fluorescent dye C and further containing white blood cell simulating particles, nucleated red blood cell simulating particles, red blood cell simulating particles and a preservation solution according to an embodiment of the present application, wherein the abscissa of the RET channel represents fluorescence intensity, the ordinate of the RET channel represents forward scattered light intensity, the abscissa of the Diff channel represents side scattered light intensity, the ordinate of the Diff channel represents fluorescence intensity, the abscissa of the Baso channel represents side scattered light intensity, the ordinate of the Baso channel represents forward scattered light intensity, the abscissa of the NRBC channel represents fluorescence intensity, and the ordinate of the NRBC channel represents forward scattered light intensity.

The reticulocyte simulating particles, the platelet simulating particles and the reference controls prepared in this example were respectively detected by using a blood cell analyzer based on fluorescence staining as detection principle. Scatter diagrams of the reticulocyte simulating particles and the platelet simulating particles are shown in FIG. 7, wherein the left diagram is the scatter diagram of the reticulocyte simulating particles, and the right diagram is the scatter diagram of the platelet simulating particles. In FIG. 7, 1 represents reticulocytes, 2 represents platelets, and 3 represents reticulated platelets. Scatter diagrams of the mid-value combined reference control are shown in FIG. 8. In FIG. 8, 1 represents reticulocytes, 2 represents platelets, 3 represents reticulated platelets, 4 represents red blood cells, 5 represents lymphocytes, 6 represents monocytes, 7 represents neutrophil granulocytes, 8 represents eosinophil granulocytes, 9 represents basophil granulocytes, and 10 represents nucleated red blood cells. The results of FIG. 7 show that, the reticulocyte simulating particles and the platelet simulating particles prepared in this embodiment have the same distribution of scatter diagrams for fresh blood reticulocytes and platelets. In the scatter diagrams of the platelet simulating particles, the upper right part of the platelets 2 is the reticulated platelets 3. The results of FIG. 8 show that, the reticulocyte simulating particles and the platelet simulating particles prepared in this embodiment do not interfere with the counting and differentiation of other particle channels, such as white blood cell channel and nucleated red blood cell channel, and can be used to prepare blood reference controls or calibrators.

Embodiment 4

The fluorescent dye D was activated by N-hydroxysuccinimide and dissolved in an organic solvent to prepare a mother solution of the fluorescent dye D.

Preparation of Reticulocyte Simulating Particles:

1. Human red blood cells were taken as raw materials and filtered, and the filtered RBCs were collected.

2. The RBCs were centrifuged and washed twice with a washing solution I, wherein the washing solution I was a solution containing 1.44 g/L disodium hydrogen phosphate, 0.27 g/L potassium dihydrogen phosphate, 8 g/L sodium chloride and 0.2 g/L potassium chloride.

3. The cell pellet was suspended in the washing solution I, and the mother solution of the fluorescent dye D was added until a final concentration of the fluorescent dye D reached 40 mg/L, and mixing was quickly performed after adding the fluorescent dye D. The cells were labeled at 2-8° C. for 30 minutes, during which mixing was performed 1-2 times to make the fluorescent dye fully contact with the cells. After reaction, a 4 times volume of a washing solution II was added for dilution, centrifugation was performed to discard the supernatant, and washing was repeated once, wherein the washing solution II was solution containing 17 g/L sodium citrate, 0.1 g/L citric acid and 5 g/L sodium chloride.

4. The cell pellet was suspended in the washing solution II, a fixative containing 50% glutaraldehyde was added until a final concentration thereof reached 0.05%, and the cells were treated at room temperature overnight. After fixing, the washing solution II containing BSA with a final concentration of 1% was added for diluting the RBCs until an appropriate concentration of the RBCs was reached, centrifugation was performed to discard supernatant, and washing was repeated twice.

5. A preservation solution was added for suspending the RBCs until an appropriate concentration of the RBCs was reached, so as to obtain reticulocyte simulating particles.

Preparation of Platelet Simulating Particles:

1. Goat blood cells were taken as raw materials and filtered, and the filtered goat RBCs were collected.

2. The goat RBCs were centrifuged and washed twice with a washing solution I, wherein the washing solution I was a solution containing 1.44 g/L disodium hydrogen phosphate, 0.27 g/L potassium dihydrogen phosphate, 8 g/L sodium chloride and 0.2 g/L potassium chloride.

3. The cell pellet was suspended in the washing solution I, a certain volume of the mother solution of the fluorescent dye D was added to until a final concentration of the fluorescent dye D reached 20 mg/L, and mixing was quickly performed after adding the fluorescent dye D. The cells were labeled at room temperature for 1 hour, during which mixing was performed 3-4 times to make the fluorescent dye fully contact with the cells. After reaction, an equal volume of a washing solution II was added for dilution, centrifugation was performed to discard the supernatant, and washing was repeated twice, wherein the washing solution II was a solution containing 35 g/L sodium citrate and 0.2 g/L citric acid;

4. The cell pellet was suspended in the washing solution II, a fixative containing 50% glutaraldehyde was added until a final concentration thereof reached 0.03%, and a fixative containing 37-40% formaldehyde was added until a final concentration thereof reached 0.15%, and the cells were treated at room temperature treatment for 8 hours.

5. After fixing, an equal volume of the washing solution II containing BSA with a final concentration of 0.15% was added for dilution, centrifugation was performed to discard the supernatant, and washing was repeated twice.

6. A preservation solution was added for suspending the PLTs until an appropriate concentration of the PLTs was reached, and the PLTs were refrigerated at 2-8° C., thus the preparation of platelet simulating particles containing reticulated platelets was completed.

Formulation of Combined Reference Controls:

White blood cell simulating particles, red blood cell simulating particles and nucleated red blood cell simulating particles were added into the reticulocyte simulating particles and platelet simulating particles prepared in this embodiment, and they were mixed in proportion to form a combined reference control, such that the concentration of each component was as follows:

mid-value: $8.5 \times 10^9$/L white blood cell simulating particles, $4.5 \times 10^{12}$/L red blood cell simulating particles, $225 \times 10^9$/L platelet simulating particles, $0.11 \times 10^{12}$/L reticulocyte simulating particles, and $0.35 \times 10^9$/L nucleated red blood cell simulating particles.

Figure 9:
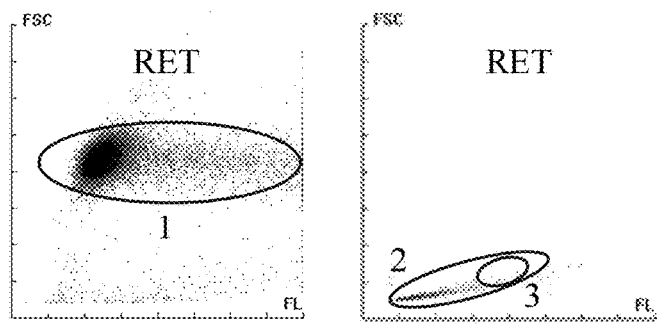
FIG. 9 illustrates scatter diagrams obtained by detecting reticulocyte simulating particles and platelet simulating particles containing reticulated platelets prepared by using the fluorescent dye D in the RET channel of a Mindray BC-6 series blood cell analyzer according to an embodiment of the present application, wherein the abscissa represents fluorescence intensity, and the ordinate represents forward scattered light intensity.
Figure 10:
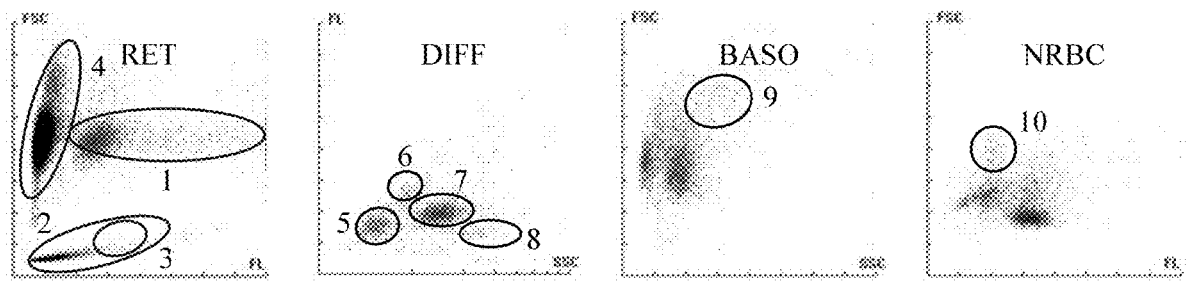
FIG. 10 illustrates scatter diagrams of mid-value combined reference control containing reticulocyte simulating particles and platelet simulating particles containing reticulated platelets prepared by using the fluorescent dye D and further containing white blood cell simulating particles, nucleated red blood cell simulating particles, red blood cell simulating particles and a preservation solution according to an embodiment of the present application, wherein the abscissa of the RET channel represents fluorescence intensity, the ordinate of the RET channel represents forward scattered light intensity, the abscissa of the Diff channel represents side scattered light intensity, the ordinate of the Diff channel represents fluorescence intensity, the abscissa of the Baso channel represents side scattered light intensity, the ordinate of the Baso channel represents forward scattered light intensity, the abscissa of the NRBC channel represents fluorescence intensity, and the ordinate of the NRBC channel represents forward scattered light intensity.

The reticulocyte simulating particles, the platelet simulating particles and the reference controls prepared in this embodiment were respectively detected by using a blood cell analyzer based on fluorescence staining as detection principle. Scatter diagrams of the reticulocyte simulating particles and the platelet simulating particles are shown in FIG. 9, wherein the left diagram is the scatter diagram of the reticulocyte simulating particles, and the right diagram is the scatter diagram of the platelet simulating particles. In FIG. 9, 1 represents reticulocytes, 2 represents platelets, and 3 represents reticulated platelets. Scatter diagrams of the mid-value combined reference control are shown in FIG. 10. In FIG. 10, 1 represents reticulocytes, 2 represents platelets, 3 represents reticulated platelets, 4 represents red blood cells, 5 represents lymphocytes, 6 represents monocytes, 7 represents neutrophil granulocytes, 8 represents eosinophil granulocytes, 9 represents basophil granulocytes, and 10 represents nucleated red blood cells. The results of FIG. 9 show that, the reticulocyte simulating particles and the platelet simulating particles prepared in this embodiment have the same distribution of scatter diagrams for fresh blood reticulocytes and platelets. In the scatter diagrams of the platelet simulating particles, the upper right part of the platelets 2 is the reticulated platelets 3. The results of FIG. 10 show that, the reticulocyte simulating particles and the platelet simulating particles prepared in this embodiment do not interfere with the counting and differentiation of other particle channels, such as white blood cell channel and nucleated red blood cell channel, and can be used to prepare blood reference controls or calibrators.

Embodiment 5

The fluorescent dye E was activated by N-hydroxysuccinimide and dissolved in an organic solvent to prepare a mother solution of the fluorescent dye E.

Preparation of Reticulocyte Simulating Particles:

1. Human red blood cells were taken as raw materials and filtered, and the filtered RBCs were collected.

2. The RBCs were centrifuged and washed twice with a washing solution I, wherein the washing solution I was a solution containing 1.44 g/L disodium hydrogen phosphate, 0.27 g/L potassium dihydrogen phosphate, 8 g/L sodium chloride and 0.2 g/L potassium chloride.

3. The cell pellet was suspended in the washing solution I, and the mother solution of the fluorescent dye E was added until a final concentration of the fluorescent dye E reached 15 mg/L, and mixing was quickly performed after adding the fluorescent dye E. The cells were labeled at room temperature for 30 minutes, during which mixing was performed 3-4 times to make the fluorescent dye fully contact with the cells. After reaction, a 4 times volume of a washing solution I was added for dilution, centrifugation was performed to discard the supernatant, and washing was repeated once.

4. The cell pellet was suspended in the washing solution II, a 37-40% formaldehyde was added until a final concentration thereof reached 0.1%, and the cells were treated at room temperature for 1 hour. After mixing, the washing solution II containing BSA with a final concentration of 0.5% was added for diluting the RBCs until an appropriate concentration of the RBCs was reached. Centrifugation was then performed to discard supernatant, and washing was repeated twice, wherein the washing solution II was a solution containing 17 g/L sodium citrate, 0.1 g/L citric acid and 5 g/L sodium chloride.

5. A preservation solution was added for suspending the RBCs until an appropriate concentration of the RBCs was reached, so as to obtain reticulocyte simulating particles.

Preparation of Platelet Simulating Particles:

1. Goat blood cells were taken as raw materials and filtered, and the filtered goat RBCs were collected.

2. The goat RBCs were centrifuged and washed twice with a washing solution I, wherein the washing solution I was a solution containing 2.0 g/L disodium hydrogen phosphate, 0.2 g/L sodium dihydrogen phosphate and 9.0 g/L sodium chloride.

3. The cell pellet was suspended in the washing solution I, a certain volume of the mother solution of the fluorescent dye E was added until a final concentration of the fluorescent dye E reached 10 mg/L, and mixing was quickly performed after adding the fluorescent dye E. The cells were labeled at room temperature for 1 hour, during which mixing was performed 3-4 times to make the fluorescent dye fully contact with the cells. After reaction, an equal volume of a washing solution II was added for dilution, centrifugation was performed to discard the supernatant, and washing was repeated once, wherein the washing solution II was a solution containing 17 g/L sodium citrate, 0.1 g/L citric acid and 5 g/L sodium chloride.

4. The cell pellet was suspended in the washing solution II, a fixative containing 37-40% formaldehyde was added until a final concentration thereof reached 0.8%, and the cells were treated at room temperature treatment overnight.

5. After fixing, the washing solution II containing BSA with a final concentration of 0.05% was added for dilution, centrifugation was performed to discard the supernatant, and washing was repeated twice.

6. A preservation solution was added for suspending the PLTs until an appropriate concentration of the PLTs was reached, and the PLTs were refrigerated at 2-8° C., thus the preparation of platelet simulating particles containing reticulated platelets was completed.

Formulation of Combined Reference Controls:

White blood cell simulating particles, red blood cell simulating particles and nucleated red blood cell simulating particles were added into the reticulocyte simulating particles and platelet simulating particles prepared in this embodiment, and they were mixed in proportion to form a combined reference control, such that the concentration of each component was as follows:

mid-value: $8.5 \times 10^9$/L white blood cell simulating particles, $4.5 \times 10^{12}$/L red blood cell simulating particles, $225 \times 10^9$/L platelet simulating particles, $0.11 \times 10^{12}$/L reticulocyte simulating particles, and $0.35 \times 10^9$/L nucleated red blood cell simulating particles.

Figure 11:
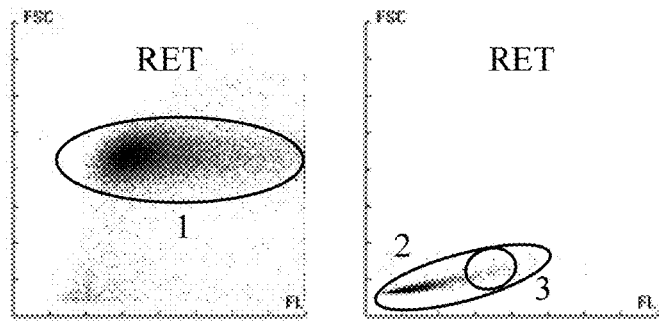
FIG. 11 illustrates scatter diagrams obtained by detecting reticulocyte simulating particles and platelet simulating particles containing reticulated platelets prepared by using the fluorescent dye E in the RET channel of a Mindray BC-6 series blood cell analyzer according to an embodiment of the present application, wherein the abscissa represents fluorescence intensity, and the ordinate represents forward scattered light intensity.
Figure 12:
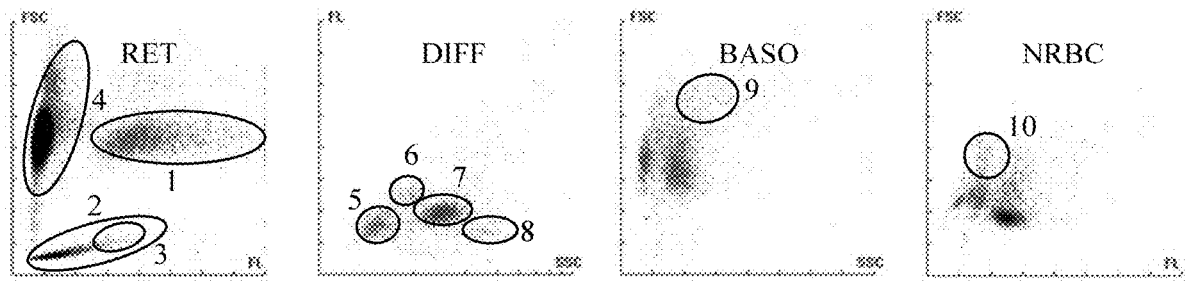
FIG. 12 illustrates scatter diagrams of mid-value combined reference controls containing reticulocyte simulating particles and platelet simulating particles containing reticulated platelets prepared by using the fluorescent dye E and further containing white blood cell simulating particles, nucleated red blood cell simulating particles, red blood cell simulating particles and a preservation solution according to an embodiment of the present application, wherein the abscissa of the RET channel represents fluorescence intensity, the ordinate of the RET channel represents forward scattered light intensity, the abscissa of the Diff channel represents side scattered light intensity, the ordinate of the Diff channel represents fluorescence intensity, the abscissa of the Baso channel represents side scattered light intensity, the ordinate of the Baso channel represents forward scattered light intensity, the abscissa of the NRBC channel represents fluorescence intensity, and the ordinate of the NRBC channel represents forward scattered light intensity.

The reticulocyte simulating particles, the platelet simulating particles and the reference controls prepared in this embodiment were respectively detected by using a blood cell analyzer based on fluorescence staining as detection principle. Scatter diagrams of the reticulocyte simulating particles and the platelet simulating particles are shown in FIG. 11, wherein the left diagram is the scatter diagram of the reticulocyte simulating particles, and the right diagram is the scatter diagram of the platelet simulating particles. In FIG. 11, 1 represents reticulocytes, 2 represents platelets, and 3 represents reticulated platelets. Scatter diagrams of the mid-value combined reference control are shown in FIG. 12. In FIG. 12, 1 represents reticulocytes, 2 represents platelets, 3 represents reticulated platelets, 4 represents red blood cells, 5 represents lymphocytes, 6 represents monocytes, 7 represents neutrophil granulocytes, 8 represents eosinophil granulocytes, 9 represents basophil granulocytes, and 10 represents nucleated red blood cells. The results of FIG. 11 show that, the reticulocyte simulating particles and the platelet simulating particles prepared in this embodiment have the same distribution of scatter diagrams for fresh blood reticulocytes and platelets. In the scatter diagrams of the platelet simulating particles, the upper right part of the platelets 2 is the reticulated platelets 3. The results of FIG. 12 show that, the reticulocyte simulating particles and the platelet simulating particles prepared in this embodiment do not interfere with the counting and differentiation of other particle channels, such as white blood cell channel and nucleated red blood cell channel, and can be used to prepare blood reference controls or calibrators.

Embodiment 6

The fluorescent dye F was activated by N-hydroxysuccinimide and dissolved in an organic solvent to prepare a mother solution of the fluorescent dye F.

Preparation of reticulocyte simulating particles:

1. Human red blood cells were taken as raw materials and filtered, and the filtered RBCs were collected.

2. The RBCs were centrifuged and washed twice with a washing solution I, wherein the washing solution I was a solution containing 1.44 g/L disodium hydrogen phosphate, 0.27 g/L potassium dihydrogen phosphate, 8 g/L sodium chloride and 0.2 g/L potassium chloride.

3. The cell pellet was suspended in the washing solution I, the mother solution of the fluorescent dye F was added until a final concentration of the fluorescent dye F reached 55 mg/L, and the fluorescent dye was slowly added to the surface of the cells and left standing for 5 minutes, then mixing was performed. The cells were labeled at 2-8° C. for 30 minutes, so the fluorescent dye was in full contact with the cells. After reaction, a 4 times volume of a washing solution II was added for dilution, centrifugation was performed to discard the supernatant, and washing was repeated once, wherein the washing solution II was a solution containing 17 g/L sodium citrate, 0.1 g/L citric acid and 5 g/L sodium chloride.

4. The cell pellet was suspended in the washing solution II, a fixative containing 50% glutaraldehyde was added until a final concentration thereof reached 0.05%, and the cells were treated at room temperature for 3 hours. After fixing, the washing solution II containing BSA with a final concentration of 0.6% was added for diluting the RBCs until an appropriate concentration of the RBCs was reached. Centrifugation was performed to discard supernatant, and washing was repeated twice.

5. A preservation solution was added for suspending the RBCs until an appropriate concentration of the RBCs was reached, so as to obtain reticulocyte simulating particles.

Preparation of Platelet Simulating Particles:

1. Goat blood cells were taken as raw materials and filtered, and the filtered goat RBCs were collected.

2. The goat RBCs were centrifuged and washed twice with a washing solution I, wherein the washing solution I was a solution containing 2.0 g/L disodium hydrogen phosphate, 0.2 g/L sodium dihydrogen phosphate and 9.0 g/L sodium chloride;

3. The cell pellet was suspended in the washing solution I, and the mother solution of the fluorescent dye F was added until a final concentration of the fluorescent dye reached 15 mg/L, and the fluorescent dye was slowly added to the surface of the cells and left standing for 8 minutes, then mixing was performed. The cells were labeled at room temperature for 15 minutes, during which mixing was performed 3-4 times to make the fluorescent dye fully contact with the cells. After reaction, a 4 times volume of a washing solution II was added for dilution, centrifugation was performed to discard the supernatant, and washing was repeated once, wherein the washing solution II was a solution containing 17 g/L sodium citrate, 0.1 g/L citric acid and 5 g/L sodium chloride.

4. The cell pellet was suspended in the washing solution II, a fixative containing glutaraldehyde was added until a final concentration thereof reached 0.015%, and the cells were treated at room temperature overnight.

5. After fixing, an equal volume of the washing solution II containing BSA with a final concentration of 0.025% was added for dilution, centrifugation was performed to discard the supernatant, and washing was repeated twice.

6. A preservation solution was added for suspending the PLTs until an appropriate concentration of the PLTs was reached, and the PLTs were refrigerated at 2-8° C., thus the preparation of platelet simulating particles containing reticulated platelets was completed.

Formulation of Combined Reference Controls:

White blood cell simulating particles, red blood cell simulating particles and nucleated red blood cell simulating particles were added into the reticulocyte simulating particles and platelet simulating particles prepared in this embodiment, and they were mixed in proportion to form a combined reference control, such that the concentration of each component was as follows:

mid-value: $8.5\times10^9$/L white blood cell simulating particles, $4.5\times10^{12}$/L red blood cell simulating particles, $225\times10^9$/L platelet simulating particles, $0.11\times10^{12}$/L reticulocyte simulating particles, and $0.35\times10^9$/L nucleated red blood cell simulating particles.

Figure 13:
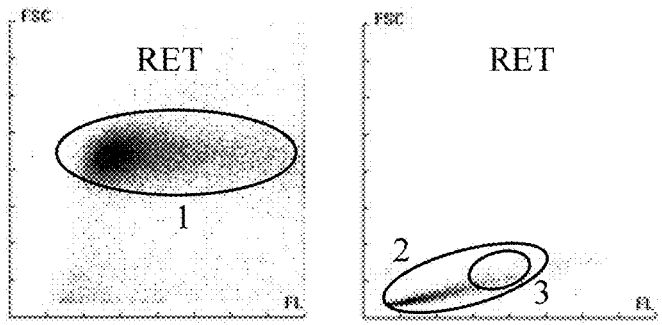
FIG. 13 illustrates scatter diagrams obtained by detecting reticulocyte simulating particles and platelet simulating particles containing reticulated platelets prepared by using the fluorescent dye F in the RET channel of a Mindray BC-6 series blood cell analyzer according to an embodiment of the present application, wherein the abscissa represents fluorescence intensity, and the ordinate represents forward scattered light intensity.
Figure 14:
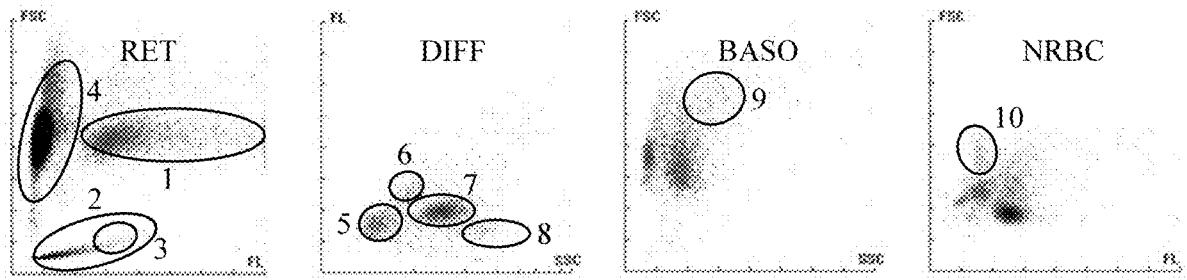
FIG. 14 illustrates scatter diagrams of mid-value combined reference controls containing reticulocyte simulating particles and platelet simulating particles containing reticulated platelets prepared by using the fluorescent dye F and further containing white blood cell simulating particles, nucleated red blood cell simulating particles, red blood cell simulating particles and a preservation solution according to an embodiment of the present application, wherein the abscissa of the RET channel represents fluorescence intensity, the ordinate of the RET channel represents forward scattered light intensity, the abscissa of the Diff channel represents side scattered light intensity, the ordinate of the Diff channel represents fluorescence intensity, the abscissa of the Baso channel represents side scattered light intensity, the ordinate of the Baso channel represents forward scattered light intensity, the abscissa of the NRBC channel represents fluorescence intensity, and the ordinate of the NRBC channel represents forward scattered light intensity.

The reticulocyte simulating particles, the platelet simulating particles and the reference controls prepared in this embodiment were respectively detected by using a blood cell analyzer based on fluorescence staining as detection principle. Scatter diagrams of the reticulocyte simulating particles and the platelet simulating particles are shown in FIG. 13, wherein the left diagram is the scatter diagram of the reticulocyte simulating particles, and the right diagram is the scatter diagram of the platelet simulating particles. In FIG. 13, 1 represents reticulocytes, 2 represents platelets, and 3 represents reticulated platelets. Scatter diagrams of the mid-value combined reference control are shown in FIG. 14. In FIG. 14, 1 represents reticulocytes, 2 represents platelets, 3 represents reticulated platelets, 4 represents red blood cells, 5 represents lymphocytes, 6 represents monocytes, 7 represents neutrophil granulocytes, 8 represents eosinophil granulocytes, 9 represents basophil granulocytes, and 10 represents nucleated red blood cells. The results of FIG. 13 show that, the reticulocyte simulating particles and the platelet simulating particles prepared in this embodiment have the same distribution of scatter diagrams for fresh blood reticulocytes and platelets. In the scatter diagrams of the platelet simulating particles, the upper right part of the platelets 2 is the reticulated platelets 3. The results of FIG. 14 show that, the reticulocyte simulating particles and the platelet simulating particles prepared in this embodiment do not interfere with the counting and differentiation of other particle channels, such as white blood cell channel and nucleated red blood cell channel, and can be used to prepare blood reference controls or calibrators.

Embodiment 7

The fluorescent dye G was activated by N-hydroxysuccinimide and dissolved in an organic solvent to prepare a mother solution of the fluorescent dye G.

Preparation of Reticulocyte Simulating Particles:

1. Human red blood cells were taken as raw materials and filtered, and the filtered RBCs were collected.

2. The RBCs were centrifuged and washed twice with a washing solution I, wherein the washing solution I was a solution containing 1.44 g/L disodium hydrogen phosphate, 0.27 g/L potassium dihydrogen phosphate, 8 g/L sodium chloride and 0.2 g/L potassium chloride.

3. The cell pellet was suspended in the washing solution I, a certain volume of the mother solution of the fluorescent dye G was added until a final concentration of the fluorescent dye G reached 85 mg/L, and mixing was quickly performed after adding the fluorescent dye G. The cells were labeled at 2-8° C. for 45 minutes, during which mixing was performed 1-2 times to make the fluorescent dye fully contact with the cells. A 4 times volume of a washing solution II was added after reaction, centrifugation was performed to discard the supernatant, and washing was repeated once, wherein the washing solution II was solution containing 17 g/L sodium citrate, 0.1 g/L citric acid and 5 g/L sodium chloride.

4. The cell pellet was suspended in the washing solution II, a fixative containing 50% glutaraldehyde was added until a final concentration thereof reached 0.1%, and the cells were treated at room temperature for 1 hour. After fixing, the washing solution II containing BSA with a final concentration of 1% was added for diluting the RBCs until an appropriate concentration of the RBCs was reached. Centrifugation was then performed to discard the supernatant, and washing was repeated twice.

5. A preservation solution was added for suspending the RBCs until an appropriate concentration of the RBCs was reached, so as to obtain reticulocyte simulating particles.

Preparation of Platelet Simulating Particles:

1. Goat blood cells were taken as raw materials and filtered, and the filtered goat RBCs were collected.

2. The goat RBCs were centrifuged and washed twice with a washing solution I, wherein the washing solution I was a solution containing 1.44 g/L disodium hydrogen phosphate, 0.27 g/L potassium dihydrogen phosphate, 8 g/L sodium chloride and 0.2 g/L potassium chloride.

3. The cell pellet was suspended in the washing solution I, and the mother solution of the fluorescent dye G was added until a final concentration of the fluorescent dye G reached 35 mg/L, and mixing was slowly performed after adding the fluorescent dye G. The cells were labeled at room temperature for 30 minutes, during which mixing was performed 3-4 times to make the fluorescent dye fully contact with the cells. A 4 times volume of a washing solution II was added for dilution after reaction, centrifugation was performed to discard the supernatant, and washing was repeated once, wherein the washing solution II was a solution containing 17 g/L sodium citrate, 0.1 g/L citric acid and 5 g/L sodium chloride.

4. The cell pellet was suspended in the washing solution II, a fixative containing 37-40% formaldehyde was added until a final concentration thereof reached 0.3%, and the cells were treated at room temperature for 4 hours.

5. After the fixing, an equal volume of a washing solution II containing BSA with a final concentration of 0.05% was added for dilution, centrifugation was performed to discard the supernatant, and washing was repeated twice.

6. A preservation solution was added for suspending the PLTs until an appropriate concentration of the PLTs was reached, and the PLTs were refrigerated at 2-8° C., and the preparation of platelet simulating particles containing reticulated platelets was completed.

Formulation of Combined Reference Controls:

White blood cell simulating particles, red blood cell simulating particles and nucleated red blood cell simulating particles were added into the reticulocyte simulating particles and platelet simulating particles prepared in this embodiment, and they were mixed in proportion to form a combined reference control, such that the concentration of each component was as follows:

mid-value: $8.5 \times 10^9$/L white blood cell simulating particles, $4.5 \times 10^{12}$/L red blood cell simulating particles, $225 \times 10^9$/L platelet simulating particles, $0.11 \times 10^{12}$/L reticulocyte simulating particles, and $0.35 \times 10^9$/L nucleated red blood cell simulating particles.

Figure 15:
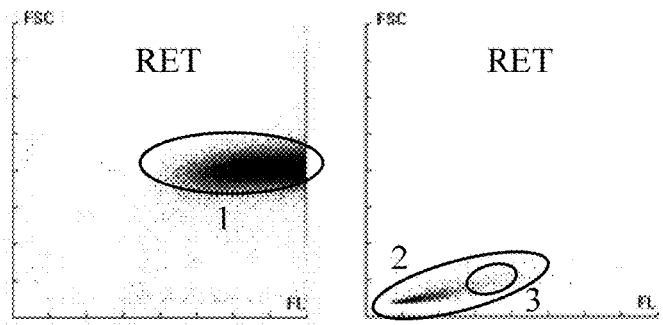
FIG. 15 illustrates scatter diagrams obtained by detecting reticulocyte simulating particles and platelet simulating particles containing reticulated platelets prepared by using the fluorescent dye Gin the RET channel of a Mindray BC-6 series blood cell analyzer according to an embodiment of the present application, wherein the abscissa represents fluorescence intensity, and the ordinate represents forward scattered light intensity.
Figure 16:
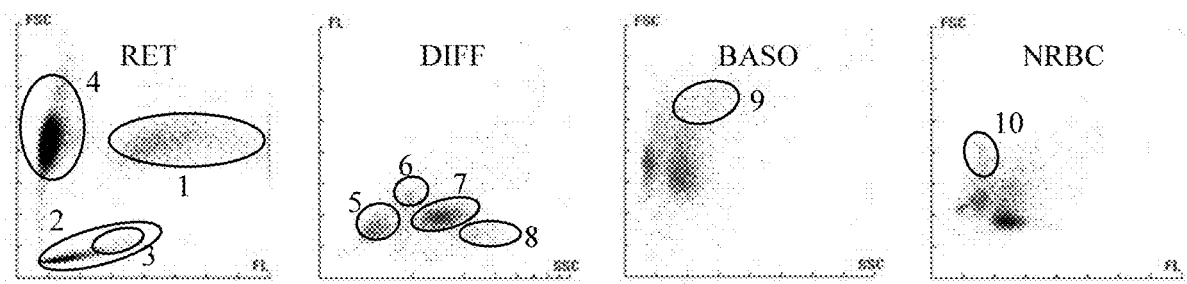
FIG. 16 illustrates scatter diagrams of mid-value combined reference controls containing reticulocyte simulating particles and platelet simulating particles containing reticulated platelets prepared by using the fluorescent dye G and further containing white blood cell simulating particles, nucleated red blood cell simulating particles, red blood cell simulating particles and a preservation solution according to an embodiment of the present application, wherein the abscissa of the RET channel represents fluorescence intensity, the ordinate of the RET channel represents forward scattered light intensity, the abscissa of the Diff channel represents side scattered light intensity, the ordinate of the Diff channel represents fluorescence intensity, the abscissa of the Baso channel represents side scattered light intensity, the ordinate of the Baso channel represents forward scattered light intensity, the abscissa of the NRBC channel represents fluorescence intensity, and the ordinate of the NRBC channel represents forward scattered light intensity.

The reticulocyte simulating particles, the platelet simulating particles and the reference controls prepared in this embodiment were respectively detected by using a blood cell analyzer based on fluorescence staining as detection principle. Scatter diagrams of the reticulocyte simulating particles and the platelet simulating particles are shown in FIG. 15, wherein the left diagram is the scatter diagram of the reticulocyte simulating particles, and the right diagram is the scatter diagram of the platelet simulating particles. In FIG. 15, 1 represents reticulocytes, 2 represents platelets, and 3 represents reticulated platelets. Scatter diagrams of the mid-value combined reference control are shown in FIG. 16. In FIG. 16, 1 represents reticulocytes, 2 represents platelets, 3 represents reticulated platelets, 4 represents red blood cells, 5 represents lymphocytes, 6 represents monocytes, 7 represents neutrophil granulocytes, 8 represents eosinophil granulocytes, 9 represents basophil granulocytes, and 10 represents nucleated red blood cells. The results of FIG. 15 show that, the reticulocyte simulating particles and the platelet simulating particles prepared in this embodiment have the same distribution of scatter diagrams for fresh blood reticulocytes and platelets. In the scatter diagrams of the platelet simulating particles, the upper right part of the platelets 2 is the reticulated platelets 3. The results of FIG. 16 show that, the reticulocyte simulating particles and the platelet simulating particles prepared in this embodiment do not interfere with the counting and differentiation of other particle channels, such as white blood cell channel and nucleated red blood cell channel, and can be used to prepare blood quality control materials or calibrators.

Embodiment 8

The fluorescent dye H was activated by N-hydroxysuccinimide and dissolved in an organic solvent to prepare a mother solution of the fluorescent dye H.

Preparation of reticulocyte simulating particles:

1. Human red blood cells were taken as raw materials and filtered, and the filtered RBCs were collected.

2. The RBCs were centrifuged and washed twice with a washing solution I, wherein the washing solution I was a solution containing 1.44 g/L disodium hydrogen phosphate, 0.27 g/L potassium dihydrogen phosphate, 8 g/L sodium chloride and 0.2 g/L potassium chloride.

3. The cell pellet was suspended in the washing solution I, and a certain volume of the mother solution of the fluorescent dye H was added until a final concentration of the fluorescent dye H reached 25 mg/L, and the fluorescent dye was slowly added to the surface of the cells and left standing for 4 minutes, mixing was then performed. The cells were labeled at room temperature for 20 minutes, during which mixing was performed 1-2 times to make the fluorescent dye fully contact with the cells. An equal volume of the washing solution I was added after reaction, centrifugation was performed to discard the supernatant, and washing was repeated twice.

4. The cell pellet was suspended in a washing solution II, a fixative containing 37-40% formaldehyde was added until a final concentration thereof reached 0.5%, and the cells were treated at room temperature for 2 hours. After fixing, the washing solution II containing BSA with a final concentration of 1% was added for diluting the RBCs until an appropriate concentration of the RBCs was reached. Centrifugation was then performed to discard the supernatant, and washing was repeated twice, wherein the washing solution II was solution containing 35 g/L sodium citrate and 0.2 g/L citric acid.

5. A preservation solution was added for suspending the RBCs until an appropriate concentration of the RBCs was reached, so as to obtain reticulocyte simulating particles.

Preparation of Platelets:

1. Goat blood cells were taken as raw materials and filtered, and the filtered goat RBCs were collected.

2. The RBCs were centrifuged and washed twice with a washing solution I, wherein the washing solution I was a solution containing 2.0 g/L disodium hydrogen phosphate, 0.2 g/L sodium dihydrogen phosphate and 9.0 g/L sodium chloride.

3. The cell pellet was suspended in the washing solution I, and a certain volume of the mother solution of the fluorescent dye H was added until a final concentration of the fluorescent dye H reached 5 mg/L, and the fluorescent dye was slowly added to the surface of the cells and left standing for 10 minutes, mixing was then performed. The cells were labeled at room temperature for 15 minutes, during which mixing was performed 1-2 times to make the fluorescent dye fully contact with the cells. An equal volume of a washing solution II was added for dilution after reaction, centrifugation was performed to discard the supernatant, and washing was repeated once, wherein the washing solution II was a solution containing 35 g/L sodium citrate and 0.2 g/L citric acid.

4. The cell pellet was suspended in the washing solution II, a fixative containing 50% glutaraldehyde was added until a final concentration thereof reached 0.05%, and the cells were treated at room temperature for 4 hours.

5. After fixing, an equal volume of the washing solution II containing BSA with a final concentration of 0.04% was added for dilution, centrifugation was performed to discard the supernatant, and washing was repeated twice.

6. A preservation solution was added for suspending the PLTs until an appropriate concentration of the PLTs was reached, and the PLTs were refrigerated at 2-8° C., thus the preparation of platelet simulating particles containing reticulated platelets was completed.

Formulation of Combined Reference Controls:

White blood cell simulating particles, red blood cell simulating particles and nucleated red blood cell simulating particles were added into the reticulocyte simulating particles and platelet simulating particles prepared in this embodiment, and they were mixed in proportion to form a combined reference control material, such that the concentration of each component was as follows:

mid-value: $8.5 \times 10^9$/L white blood cell simulating particles, $4.5 \times 10^{12}$/L red blood cell simulating particles, $225 \times 10^9$/L platelet simulating particles, $0.11 \times 10^{12}$/L reticulocyte simulating particles, and $0.35 \times 10^9$/L nucleated red blood cell simulating particles.

Figure 17:
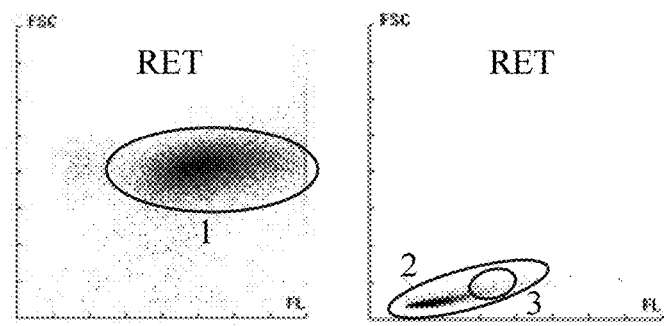
FIG. 17 illustrates scatter diagrams obtained by detecting reticulocyte simulating particles and platelet simulating particles containing reticulated platelets prepared by using the fluorescent dye H in the RET channel of a Mindray BC-6 series blood cell analyzer according to an embodiment of the present application, wherein the abscissa represents fluorescence intensity, and the ordinate represents forward scattered light intensity.
Figure 18:
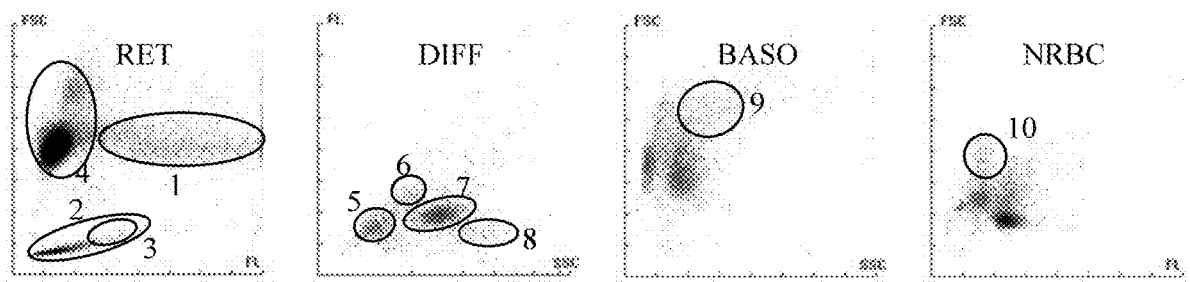
FIG. 18 illustrates scatter diagrams of mid-value combined reference controls containing reticulocyte simulating particles and platelet simulating particles containing reticulated platelets prepared by using the fluorescent dye H and further containing white blood cell simulating particles, nucleated red blood cell simulating particles, red blood cell simulating particles and a preservation solution according to an embodiment of the present application, wherein the abscissa of the RET channel represents fluorescence intensity, the ordinate of the RET channel represents forward scattered light intensity, the abscissa of the Diff channel represents side scattered light intensity, the ordinate of the Diff channel represents fluorescence intensity, the abscissa of the Baso channel represents side scattered light intensity, the ordinate of the Baso channel represents forward scattered light intensity, the abscissa of the NRBC channel represents fluorescence intensity, and the ordinate of the NRBC channel represents forward scattered light intensity.

The reticulocyte simulating particles, the platelet simulating particles and the reference controls prepared in this embodiment were respectively detected by using a blood cell analyzer based on fluorescence staining as detection principle. Scatter diagrams of the reticulocyte simulating particles and the platelet simulating particles are shown in FIG. 17, wherein the left diagram is the scatter diagram of the reticulocyte simulating particles, and the right diagram is the scatter diagram of the platelet simulating particles. In FIG. 17, 1 represents reticulocytes, 2 represents platelets, and 3 represents reticulated platelets. Scatter diagrams of the mid-value combined reference control are shown in FIG. 18. In FIG. 18, 1 represents reticulocytes, 2 represents platelets, 3 represents reticulated platelets, 4 represents red blood cells, 5 represents lymphocytes, 6 represents monocytes, 7 represents neutrophil granulocytes, 8 represents eosinophil granulocytes, 9 represents basophil granulocytes, and 10 represents nucleated red blood cells. The results of FIG. 17 show that, the reticulocyte simulating particles and the platelet simulating particles prepared in this embodiment have the same distribution of scatter diagrams for fresh blood reticulocytes and platelets. In the scatter diagrams of the platelet simulating particles, the upper right part of the platelets 2 is the reticulated platelets 3. The results of FIG. 18 show that, the reticulocyte simulating particles and the platelet simulating particles prepared in this embodiment do not interfere with the counting and differentiation of other particle channels, such as white blood cell channel and nucleated red blood cell channel, and can be used to prepare blood reference controls or calibrators.

Figure 4:
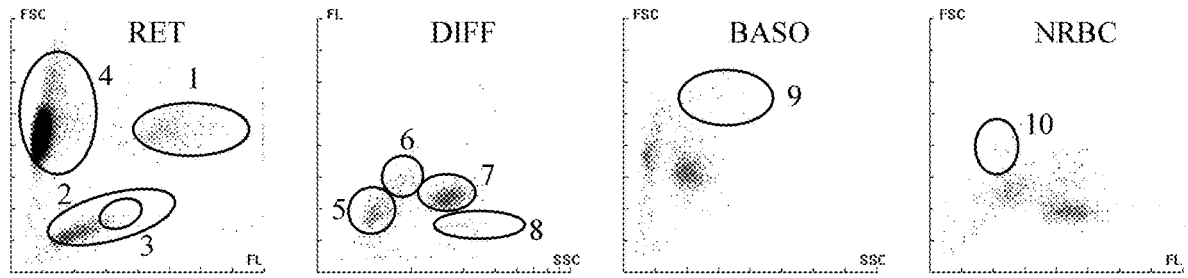
FIG. 4 illustrates scatter diagrams of low-value, mid-value and high-value combined reference controls after being preserved at 2-8° C. for 3 months according to an embodiment of the present application, wherein the abscissa of the RET channel represents fluorescence intensity, the ordinate of the RET channel represents forward scattered light intensity, the abscissa of the Diff channel represents side scattered light intensity, the ordinate of the Diff channel represents fluorescence intensity, the abscissa of the Baso channel represents side scattered light intensity, the ordinate of the Baso channel represents forward scattered light intensity, the abscissa of the NRBC channel represents fluorescence intensity, and the ordinate of the NRBC channel represents forward scattered light intensity.
Figure 4:
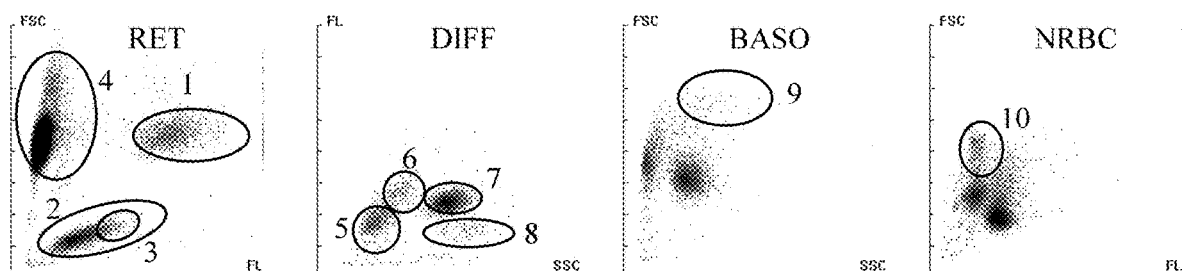
Figure 4:
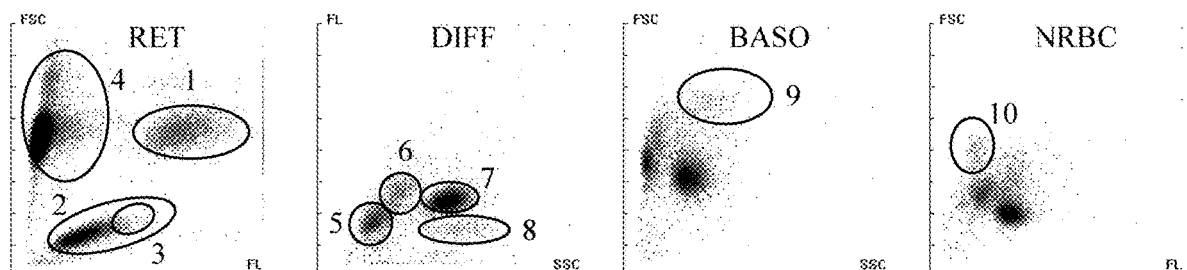

On the basis of the above embodiments, the combined reference controls prepared in the eight embodiments of the present application were refrigerated at 2-8° C. for three months and were periodically detected by using a blood cell analyzer every week. The results show that, the scatter diagrams of the reference controls prepared in the present application in each channel did not change significantly, wherein the scatter diagrams of the low-value, mid-value and high-value combined reference controls prepared in embodiment 1 measured after three months are shown in FIG. 4. It can be seen that, the components of the reference control prepared in the present application have high stability, and even the reference control prepared in the present application is mixed with reference controls of other cells, the performance of the respective cell stimulants can be kept stable without mutual influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A method for preparing reticulocyte simulating particles, comprising:

treating mammalian anucleated red blood cells, each of which has a volume of 60-120 fL, with a protein fluorescent dye having a carboxyl group activated by N-hydroxysuccinimide, the carboxyl group activated by N-hydroxysuccinimide of the protein fluorescent dye is covalently cross-linked with an activatable amino group on membrane surfaces of the mammalian anucleated red blood cells; and treating the mammalian anucleated red blood cells with a fixative to prepare the reticulocyte simulating particles, wherein the fixative is at least one selected from a group consisting of dichromate, formaldehyde, and glutaraldehyde, wherein the treating with the fixative is performed before or after the treating with the protein fluorescent dye; and obtaining scatter diagram of the prepared reticulocyte stimulating particles, wherein in a scatter diagram of the prepared reticulocyte simulating particles, the reticulocyte simulating particles have a same distribution as fresh blood reticulocytes in a scatter diagram of fresh blood, wherein the scatter diagram of the reticulocyte simulating particles is obtained by detecting the reticulocyte simulating particles in a RET channel of a blood analyzer; the scatter diagram of the fresh blood is obtained by detecting a fresh blood sample in the RET channel of the blood analyzer; and in both of the scatter diagrams, an abscissa represents fluorescence intensity and an ordinate represents forward scattered light intensity;

wherein the protein fluorescent dye comprises at least one fluorescent dye selected from the group consisting of fluorescent dyes A, B, C, D, E, F, G, and H, structural formula of the fluorescent dye A is

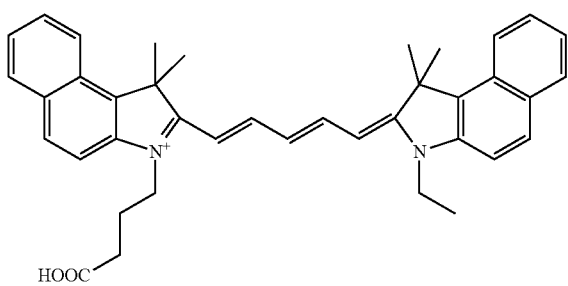 [SMILES: CCN1/C(=C/C=C/C=C/C2=[N+](CCCC(=O)O)c3ccc4ccccc4c3C2(C)C)C(C)(C)c2c1ccc1ccccc21]

structural formula of the fluorescent dye B is

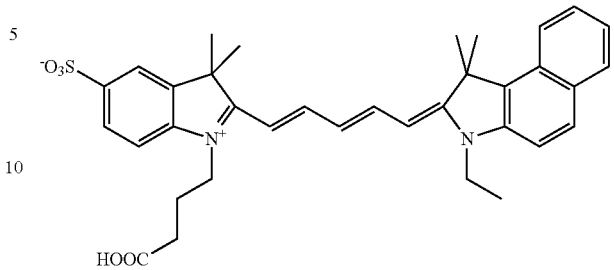

structural formula of the fluorescent dye C is

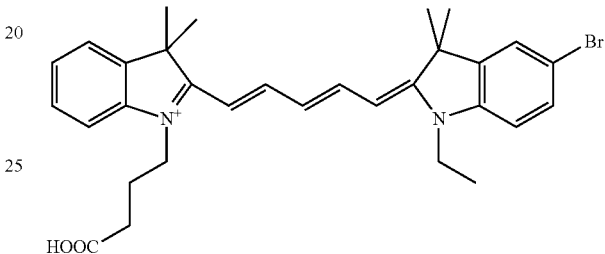

structural formula of the fluorescent dye D is

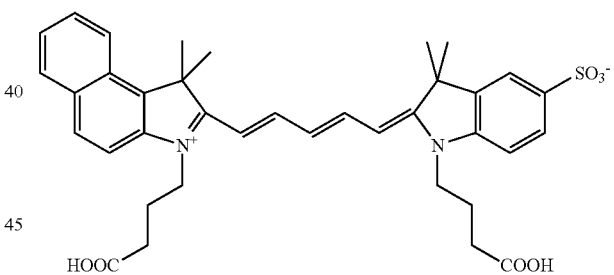

structural formula of the fluorescent dye E is

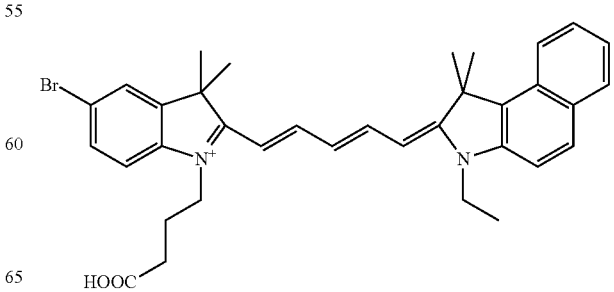

structural formula of the fluorescent dye F is

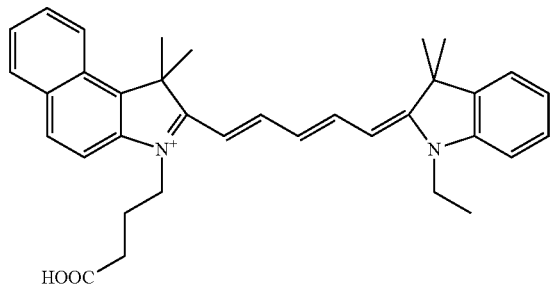 [SMILES: CCN1/C(=C/C=C/C=C/C2=[N+](CCCC(=O)O)c3ccc4ccccc4c3C2(C)C)C(C)(C)c2ccccc21]

structural formula of the fluorescent dye G is

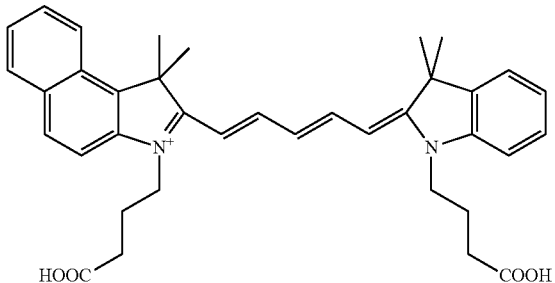 [SMILES: CC1(C)C(/C=C/C=C/C=C2/N(CCCC(=O)O)c3ccccc3C2(C)C)=[N+](CCCC(=O)O)c2ccc3ccccc3c21]

structural formula of the fluorescent dye H is

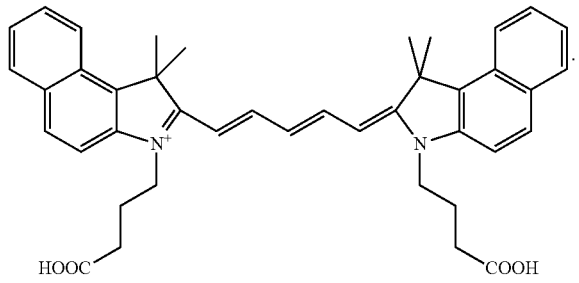 [SMILES: CC1(C)C(/C=C/C=C/C=C2/N(CCCC(=O)O)c3ccc4ccccc4c3C2(C)C)=[N+](CCCC(=O)O)c2ccc3ccccc3c21]

2. A method for preparing platelet stimulating particles, comprising: treating mammalian anucleated red blood cells, each of which has a volume of 2-25 fL, with a protein fluorescent dye having a carboxyl group activated by N-hydroxysuccinimide, the carboxyl group activated by N-hydroxysuccinimide of the protein fluorescent dye is covalently cross-linked with an activatable amino group on membrane surfaces of the mammalian anucleated red blood cells; and treating the mammalian anucleated red blood cells with a fixative to prepare the reticulocyte simulating particles, wherein the fixative is at least one selected from a group consisting of dichromate, formaldehyde, and glutaraldehyde, wherein the treating with the fixative is performed before or after the treating with the protein fluorescent dye; and obtaining scatter diagram of the prepared platelet stimulating particles, wherein in a scatter diagram of the prepared platelet simulating particles, the platelet simulating particles have a same distribution as fresh blood reticulocytes in a scatter diagram of fresh blood, wherein the scatter diagram of the platelet simulating particles is obtained by detecting the platelet simulating particles in a RET channel of a blood analyzer; the scatter diagram of the fresh blood is obtained by detecting a fresh blood sample in the RET channel of the blood analyzer; and in both of the scatter diagrams, an abscissa represents fluorescence intensity and an ordinate represents forward scattered light intensity;

wherein the protein fluorescent dye comprises at least one fluorescent dye selected from the group consisting of fluorescent dyes A, B, C, D, E, F, G, and H, structural formula of the fluorescent dye A is

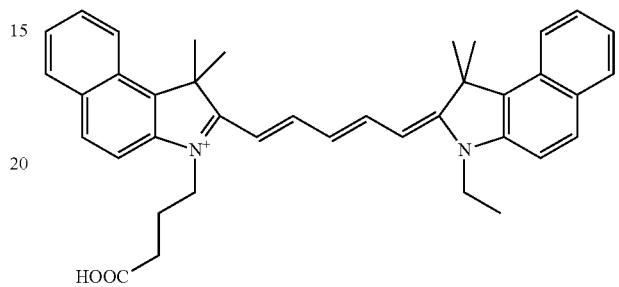

structural formula of the fluorescent dye B is

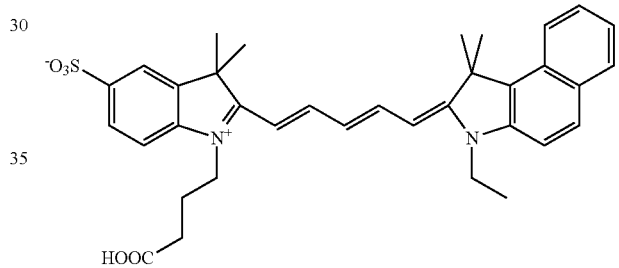

structural formula of the fluorescent dye C is

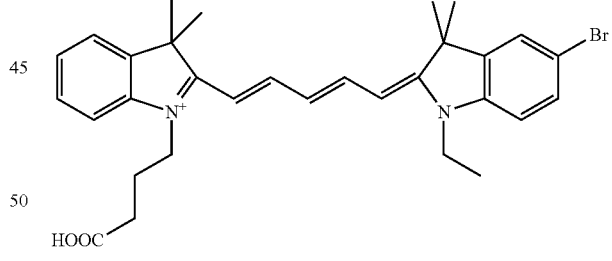

structural formula of the fluorescent dye D is

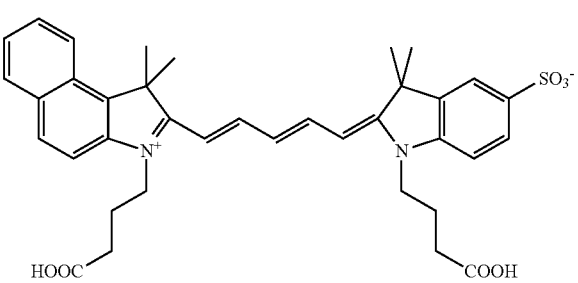

structural formula of the fluorescent dye E is

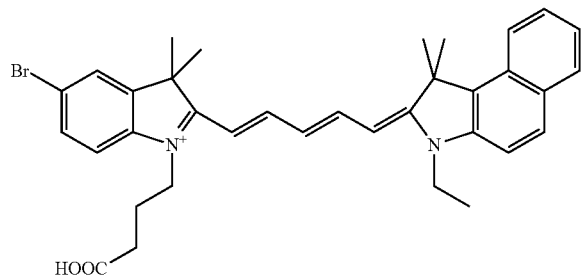 [SMILES: CCN1/C(=C/C=C/C=C/C2=[N+](CCCC(=O)O)c3ccc(Br)cc3C2(C)C)C(C)(C)c2c1ccc1ccccc21]

structural formula of the fluorescent dye F is

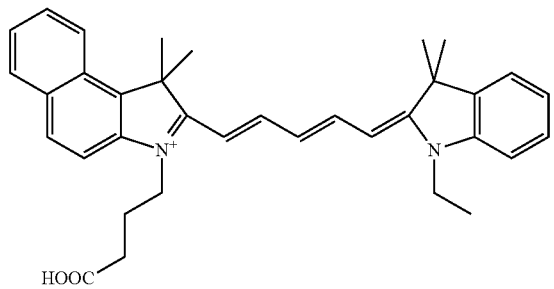 [SMILES: CCN1/C(=C/C=C/C=C/C2=[N+](CCCC(=O)O)c3ccc4ccccc4c3C2(C)C)C(C)(C)c2ccccc21]

structural formula of the fluorescent dye G is

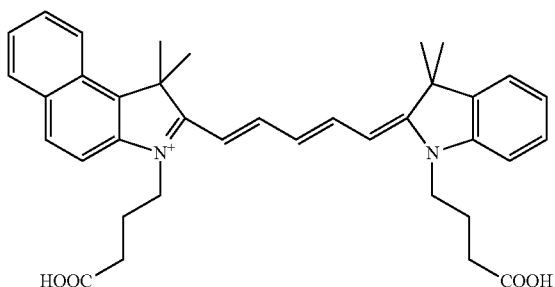 [SMILES: CC1(C)C(/C=C/C=C/C=C2/N(CCCC(=O)O)c3ccccc3C2(C)C)=[N+](CCCC(=O)O)c2ccc3ccccc3c21]

structural formula of the fluorescent dye H is

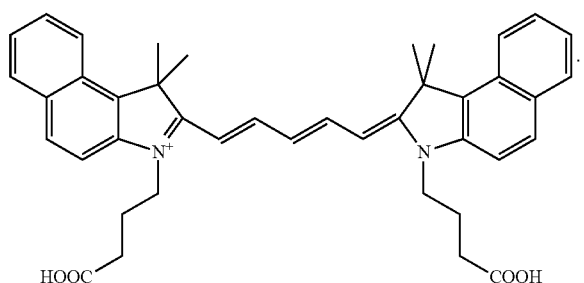 [SMILES: CC1(C)C(/C=C/C=C/C=C2/N(CCCC(=O)O)c3ccc4ccccc4c3C2(C)C)=[N+](CCCC(=O)O)c2ccc3ccccc3c21]

3. The preparation method according to claim 1, wherein the treating mammalian anucleated red blood cells, each of which has a volume of 60-120 fL, with a protein fluorescent dye having a carboxyl group activated by N-hydroxysuccinimide comprises the following steps:
   extracting the mammalian anucleated red blood cells, each of which has a volume of 60-120 fL;
   providing the protein fluorescent dye activated by N-hydroxysuccinimide, wherein the protein fluorescent dye has an activatable carboxyl group, and the carboxyl group is activated by N-hydroxysuccinimide;
   incubating the mammalian anucleated red blood cells with the protein fluorescent dye activated by N-hydroxysuccinimide for treating the mammalian anucleated red blood cells, thus obtaining treated anucleated red blood cells.

4. The preparation method according to claim 1, wherein the method further comprises washing the stained and treated cells treated with the fixative and the protein fluorescent dye.

5. The preparation method according to claim 1, wherein the protein fluorescent dye having a carboxyl group activated by N-hydroxysuccinimide has a structure represented by general formula I, general formula I

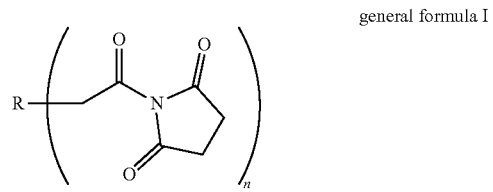

in general formula I, R is a protein fluorescent dye, n is an integer of 1-4, and n depends on the number of carboxyl groups in the protein fluorescent dye.

6. The preparation method according to claim 2, wherein the treating mammalian anucleated red blood cells, each of which has a volume of 2-25 fL, with a protein fluorescent dye having a carboxyl group activated by N-hydroxysuccinimide comprises the following steps:
   extracting the mammalian anucleated red blood cells, each of which has a volume of 2-25 fL;
   providing the protein fluorescent dye activated by N-hydroxysuccinimide, wherein the protein fluorescent dye has an activatable carboxyl group, and the carboxyl group is activated by N-hydroxysuccinimide;
   incubating the mammalian anucleated red blood cells with the protein fluorescent dye activated by N-hydroxysuccinimide for treating the mammalian anucleated red blood cells, thus obtaining treated anucleated red blood cells.

7. The preparation method according to claim 2, wherein the method further comprises washing the cells treated with the fixative and the protein fluorescent dye.

8. The preparation method according to claim 2, wherein the protein fluorescent dye having a carboxyl group activated by N-hydroxysuccinimide has a structure represented by general formula I,
general formula I general formula I

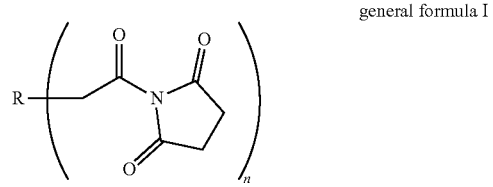

in general formula I, R is a protein fluorescent dye, n is an integer of 1-4, and n depends on the number of carboxyl groups in the protein fluorescent dye.

9. The preparation method according to claim 1, wherein the method further comprises preserving the reticulocyte simulating particles at 2-8° C. for three months.

10. The preparation method according to claim 9, wherein the preserved reticulocyte simulating particles are used as reference control or calibrator to periodically detect the blood cell analyzer.

11. The preparation method according to claim 2, wherein the method further comprises preserving the platelet simulating particles at 2-8° C. for three months.

12. The preparation method according to claim 11, wherein the preserved platelet simulating particles are used as reference control or calibrator to periodically detect the blood cell analyzer.

* * * * *